United States Patent [19]
Koh et al.

[11] Patent Number: 5,783,641
[45] Date of Patent: Jul. 21, 1998

[54] PROCESS FOR MODIFYING SURFACES OF POLYMERS, AND POLYMERS HAVING SURFACES MODIFIED BY SUCH PROCESS

[75] Inventors: Seok-Keun Koh; Hyung-Jin Jung; Seok-Kyun Song; Won-Kook Choi; Young-Soo Yoon, all of Seoul; Jun-Sik Cho, Inchon, all of Rep. of Korea

[73] Assignee: Korea Institute of Science and Technology, Seoul, Rep. of Korea

[21] Appl. No.: 608,054

[22] Filed: Feb. 28, 1996

[30] Foreign Application Priority Data

| Apr. 19, 1995 | [KR] | Rep. of Korea | 9194/1995 |
| Jun. 26, 1995 | [KR] | Rep. of Korea | 17514/1995 |
| Feb. 1, 1996 | [KR] | Rep. of Korea | 2456/1996 |

[51] Int. Cl.$^6$ ............................................. C08K 8/00
[52] U.S. Cl. ............................... 525/333.8; 523/300
[58] Field of Search ........................... 525/333.8; 523/300

[56] References Cited

U.S. PATENT DOCUMENTS 4,338,420  7/1982  Arbit ................................. 525/388

FOREIGN PATENT DOCUMENTS 60-13823  1/1985  Japan .
61-171740  8/1986  Japan .

OTHER PUBLICATIONS

D. T. Clark, et al., "Surface Modification by Plasma Techniques. I. The Interactions of a Hydrogen Plasma with Fluoropolymer Surfaces", Journal Of Polymer Science: Part A: Polymer Chemistry, vol. 25, (pp. 2643–2664), 1987.

D. Briggs, et al., Surface Modification of Poly(ethylene terephthalate) by Electrical Discharge Treatment, Polymer, vol. 21, (pp. 895–900), Aug. 1980.

Da Youxian, et al., "Surface Modification of Poly(tetrafluoroethylene) by Gas Plasma Treatment", Polymer, vol. 32, No. 6, (pp. 1126–1130), 1991.

Jun–Sik Cho, et al., "Improving Wettability of Polymer Surface (PMMA, PC) and Glass by Ar+ Ion Beam Irradiation", The Korean Vacuum Academic Society 8th Symposium Abstracts, Feb. 16 to 17, 1995.

Seok–Keun Koh, et al., "Improving Wettability of Polymer Surfaces and Adhesion between Metal and Polymer by Ar+Irradiation", Materials Research Society 1994 Fall Meeting Abstracts, Nov. 27–Dec. 2, 1994.

Primary Examiner—Edward J. Cain
Attorney, Agent, or Firm—Oblon, Spivak, McClelland, Maier & Neustadt, P.C.

[57] ABSTRACT

The present invention relates to a process for modifying a polymer surface by irradiating ion particles with energy on a polymer surface, while blowing the reactive gas directly on the polymer surface under vacuum condition, to decrease the wetting angle of the polymer surface. The process for modifying the polymer surface according to the present invention can be widely used in the application fields of polymers because it provides effects of increasing the spreading of aqueous dyestuffs, increasing adhesive strength with other materials and inhibition of light scattering by decreasing the wetting angle of the polymer surface.

9 Claims, 22 Drawing Sheets

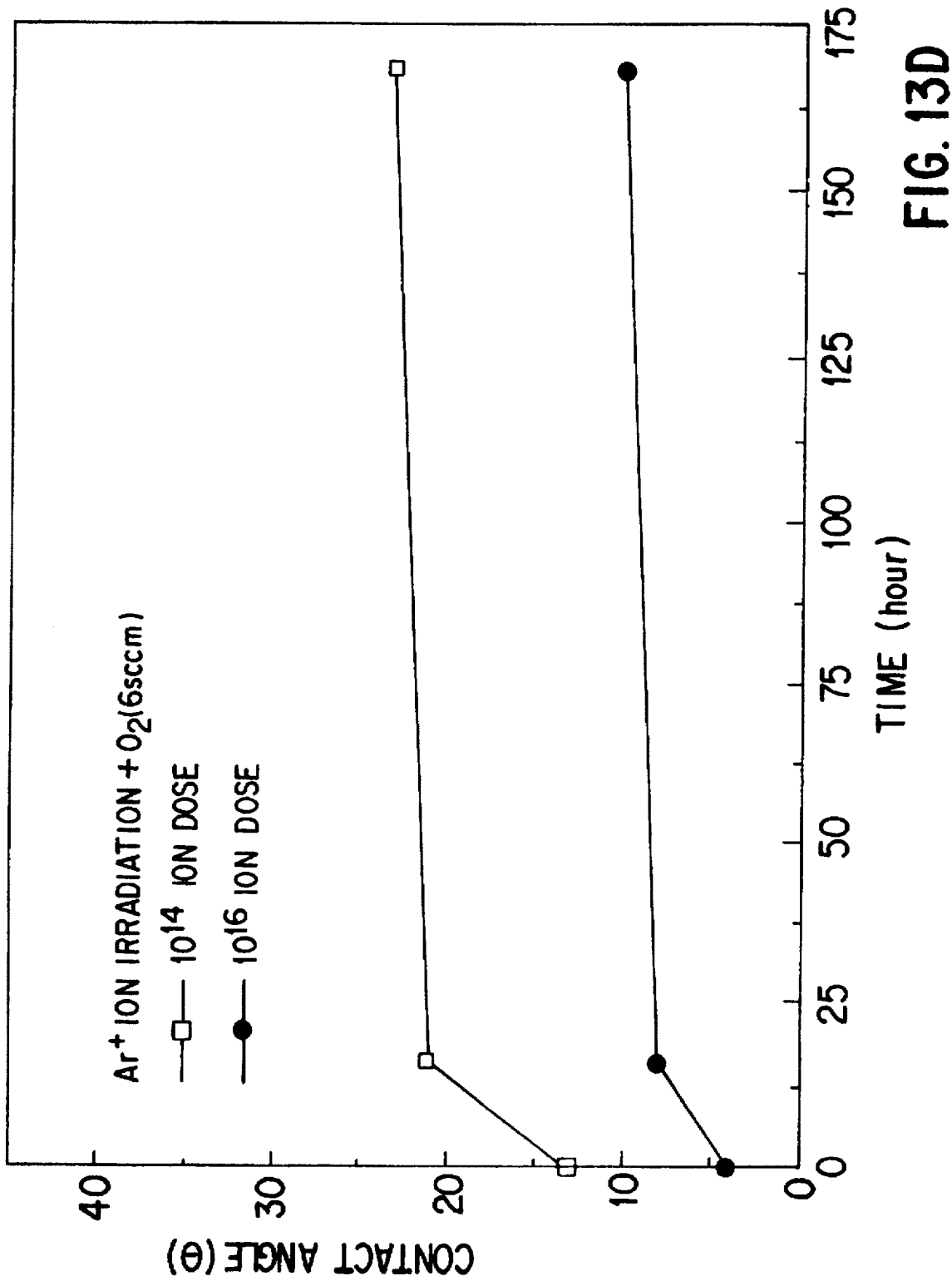

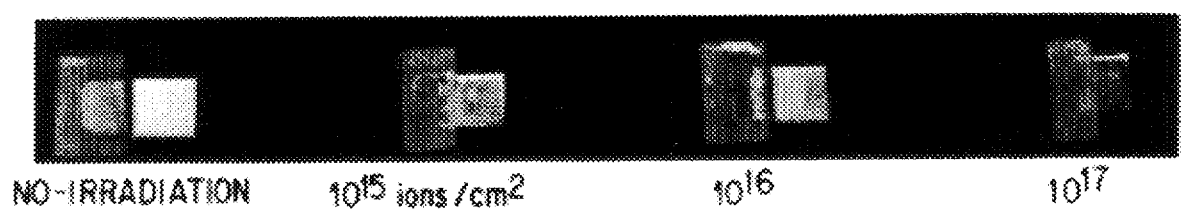
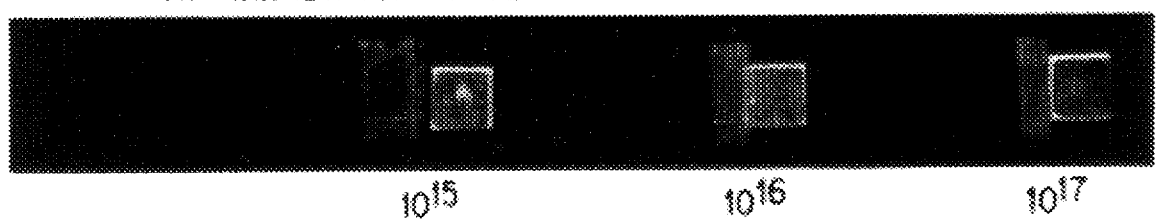
FIG. 16
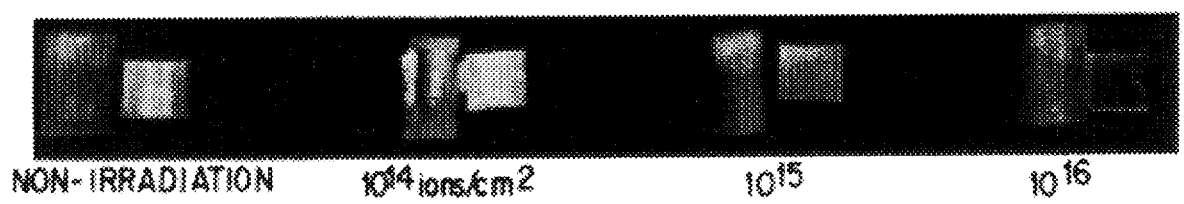
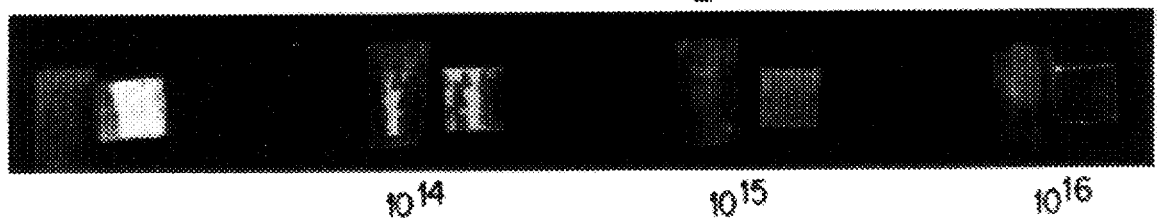
FIG. 17

PROCESS FOR MODIFYING SURFACES OF POLYMERS, AND POLYMERS HAVING SURFACES MODIFIED BY SUCH PROCESS

BACKGROUND OF THE INVENTION

1. Field of the Invention

The present invention relates to a process for modifying surfaces of polymers and to polymers having surfaces modified by the process, wherein the process comprises irradiating ion particles with energy on a polymer surface, with blowing a reactive gas directly on the polymer surface, under vacuum condition to decrease a wetting angle and increase an adhesive strength of the polymer surface. The wetting angle is an important factor in identifying the condition of the polymer surface which is modified. A decrease in wetting angle implies that the polymer surface attracts water and also implies the surface exhibits hydrophilicity. Thus, the occurrence of spreading phenomenon increases when an aqueous dyestuff is applied on such a polymer surface, adhesive strength with other materials increases, and light scattering generated by condensation of water in the air is inhibited. As described above, the surface condition of a polymer can be modified by decreasing the wetting angle.

2. Description of the Prior Art

In general, changes in wetting angle have been achieved by 1) surface roughing, 2) surface cleaning, 3) providing a coating with hydrophilic functional groups, and 4) directly synthesizing the surface with hydrophilic functional groups, while increases in adhesive strength are achieved by similar methods used for changing the wetting angle, namely 1) forming chemical linkages between the two materials to be attached, 2) surface cleaning, 3) applying a material which is adhesive to the materials to be attached, and 4) forming the surface with functional groups for assisting chemical bonds with the materials to be adhered (mainly hydrophilic functional groups).

In particular, examples of processes currently used for decreasing the wetting angle in modifying polymer surfaces include, surface synthesizing with hydrophilic functional groups, high voltage corona discharge and direct current plasma discharge.

Among these, high voltage corona discharge is a process in which a polymer sample is placed in a vacuum chamber in which reactive gas or gases are filled until atmospheric pressure is reached and then the sample is ionized by electrons emitted from electrodes to form plasma having negative charges and positive charges in an electromagnetical amount equal to that of electrons (hereafter referred to as "cold plasma"), and the reactive gas ions thusly formed are reacted on the sample surface to modify the surface thereof. Although this process is most widely used in modifying polymer surfaces, as disclosed in Japanese Patent Laid-Open No. 60-13823 (Jan. 24, 1985), only a process of treating the surface of vinyl chloride with chlorine gas under atmospheric pressure by the use of high voltage corona discharge is disclosed, in which the wetting angle was decreased from 73° to 32°, and this decrease of wetting angle was not prominent.

Although the process is similar to that of high voltage corona discharge, direct current plasma discharge uses plasma generated through glow discharge (referred to as "thermal plasma"), i.e., ionized reactive gas or gases, which were formed after charging the reactive gas or gases in a vacuum chamber under 0.01–5 torr (atmospheric pressure is 760 torr). However, this process does not demonstrate sufficient effects in decreasing the wetting angle. For example, Japanese Patent Laid-Open No. 61-171740 (Aug. 2, 1985) discloses that the wetting angle measured after modifying the surface of polymethyl methacrylate (PMMA) polymer in argon gas under a pressure of 0.1 torr, was found to be 40°, and the wetting angle increased to 60° after washing the PMMA polymer surface several times with water. Meanwhile, the wetting angle measured after modifying the surface of BX3 polymer under a pressure of 0.1 mbar (atmospheric pressure is 1013 mbar) in oxygen gas atmosphere was known to be between 48° to 20°, when treated with an applied voltage of 10–100 W for 160 seconds [D. W. Fakes, J. M. Newton, J. F. Wattes and M. J. Edgell, Surface and Interface Analysis, vol.10 416–423(1987)].

The conventional processes, as mentioned above, can not significantly decrease the wetting angle, whereby the effects of spreading aqueous dyestuffs on polymer surface, increasing adhesive strength with other polar materials, and inhibition of light scattering because of water condensation in the air are insufficient. In addition, if the wetting angle is decreased using conventional techniques, the change of the wetting angle tends to approach toward a certain value according to an increase in time for surface modification, as the case for Teflon (PTFE), whereby the wetting angle with water is changed from about 95° to about 50° when using hydrogen plasma [D. T. Clark and D. R. Hutton, J. Polym. Sci., Part A, 25, 2643(1987)] or is changed from about 110° to about 70° when using water steam plasma [D. Yousian and H. J. Griesser, Polymer, 32(6) 1126(1987)].

The present invention allows modification of the polymer surfaces by irradiating ion particles with energy on the polymer surfaces, while blowing reactive gas or gases directly on the polymer surface under vacuum condition, to greatly decrease the wetting angle and to increase adhesive strength of the polymer surfaces.

SUMMARY OF THE INVENTION

Thus, it is an object of the present invention to provide a process for modifying polymer surfaces by irradiating ion particles with energy thereon, while blowing reactive gas or gases directly on the polymer surfaces under vacuum condition, to decrease the wetting angle and to increase adhesive strength of the polymer surfaces.

Another object of the present invention is to provide a polymer which has a surface modified by the above process.

[A: samples 3-1 to 3-4/B: samples 3-5 to 3-9/C: samples 3-10, and 3-12 to 3-16]

Figure 12A:
Figure 12B:
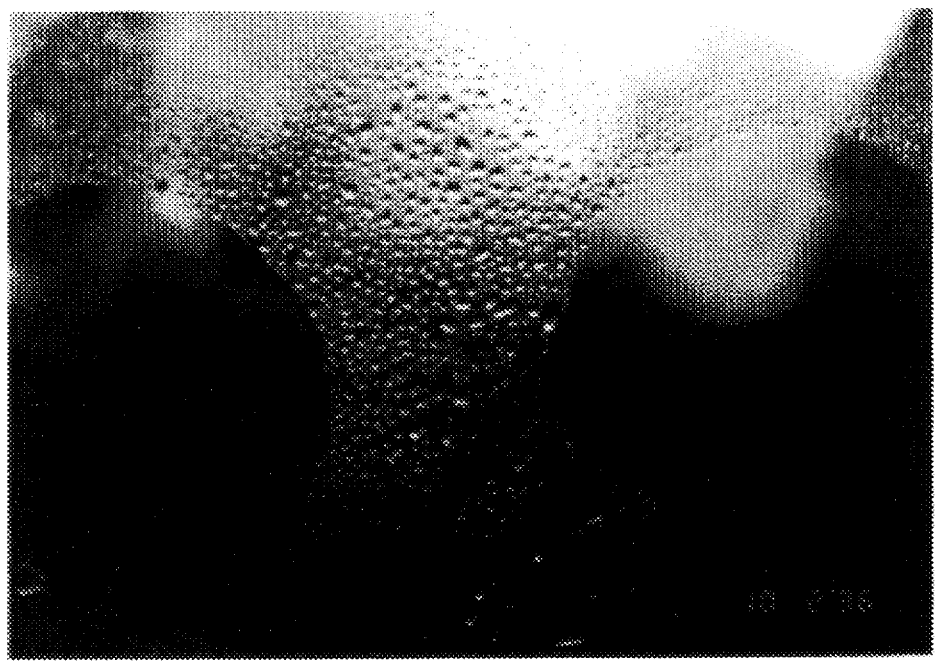

FIGS. 12A and 12B are photographs showing surface conditions after spraying water on the surface of polymer PE film prior to and after surface modifying. [A: prior to surface modifying/B: after surface modifying (circular portion)]

FIGS. 13A, 13B, 13C and 13D are graphs illustrating the results of measuring the wetting angle of samples 3-1, 3-2, 3-11 and 3-14 according to Example 3-2).

[A: atmospheric exposure of sample 3-1/B: samples 3-1 and 3-2 stored in water/C: atmospheric exposure of samples 3-11 and 3-14/D: sample 3-11 stored in water]

Figure 14C:
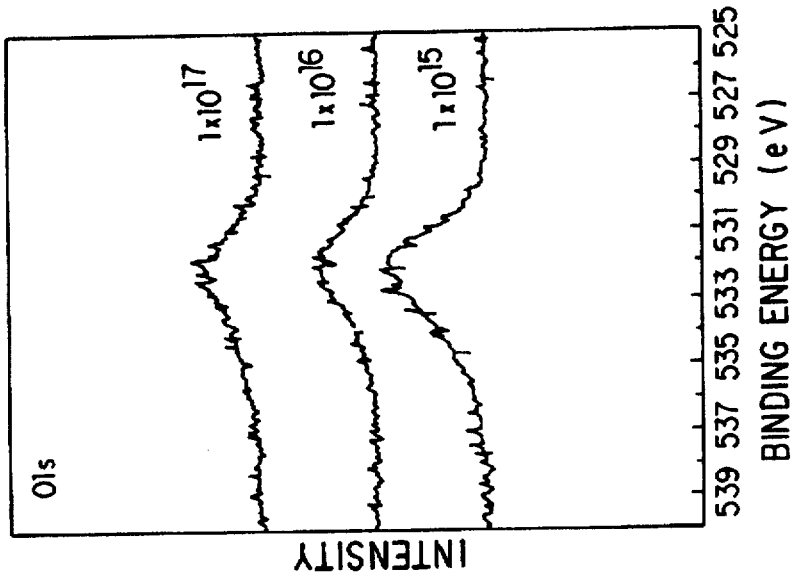
Figure 14B:
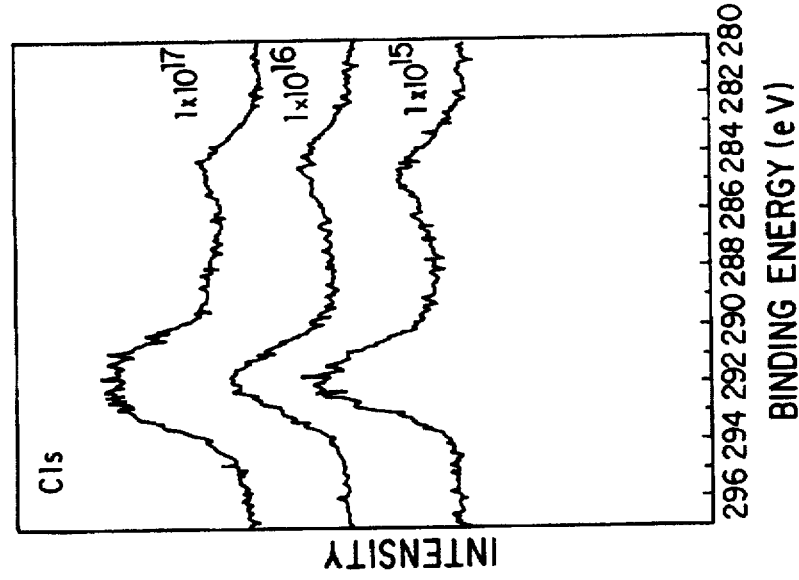
Figure 14A:
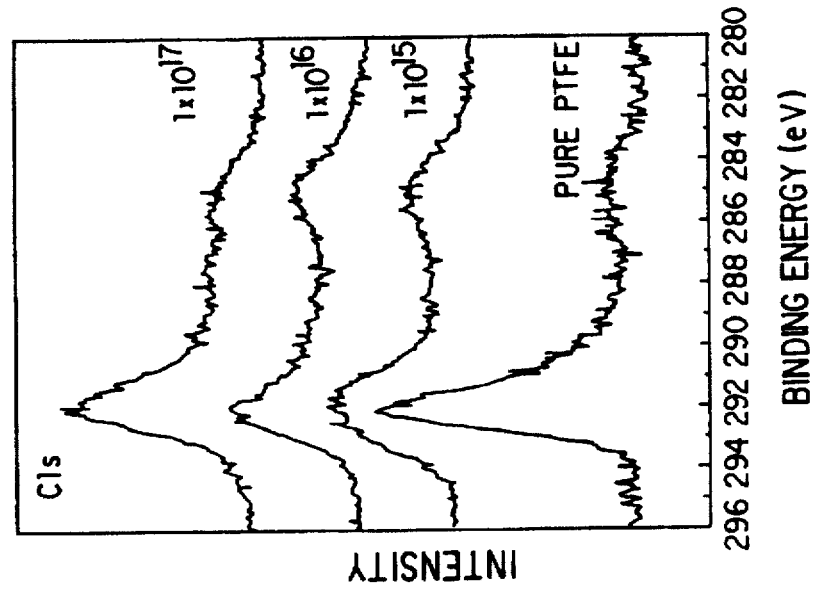

FIGS. 14A, 14B and 14C are graphs showing the results of ESCA surface analysis of samples 3-1 and 3-2.

[A: results of C1 analysis of sample 3-1/B: results of C1 analysis of sample 3-2/C: results of O1 (Oxygen 1) analysis of sample 3-2]

Figure 15A:
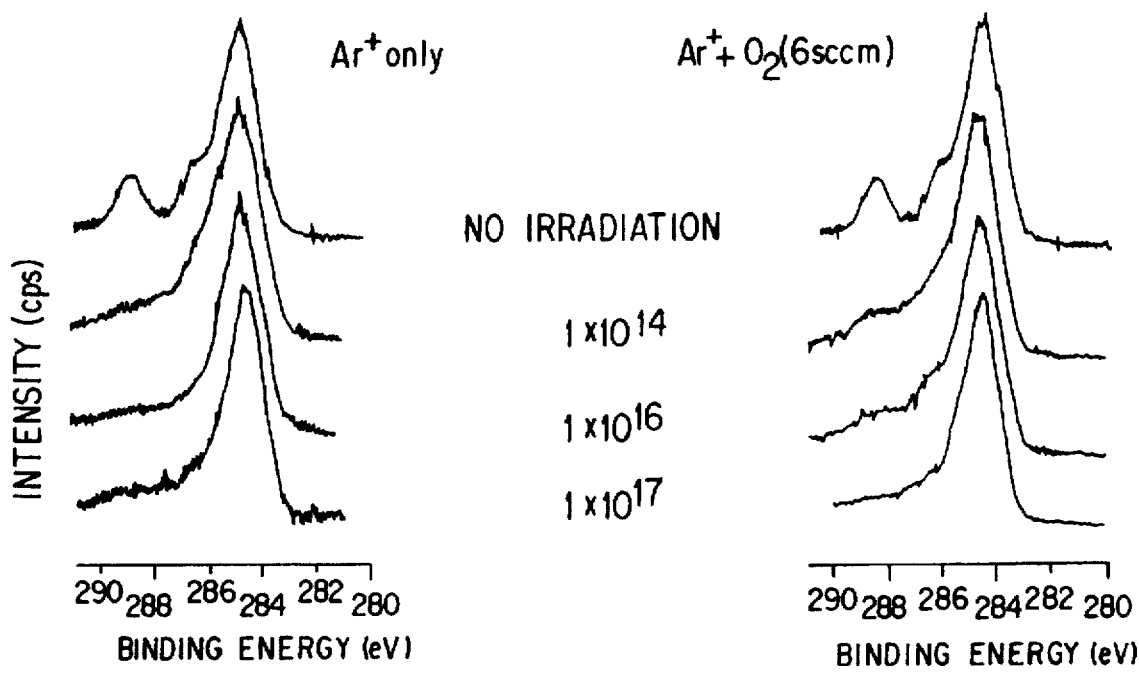
Figure 15B:
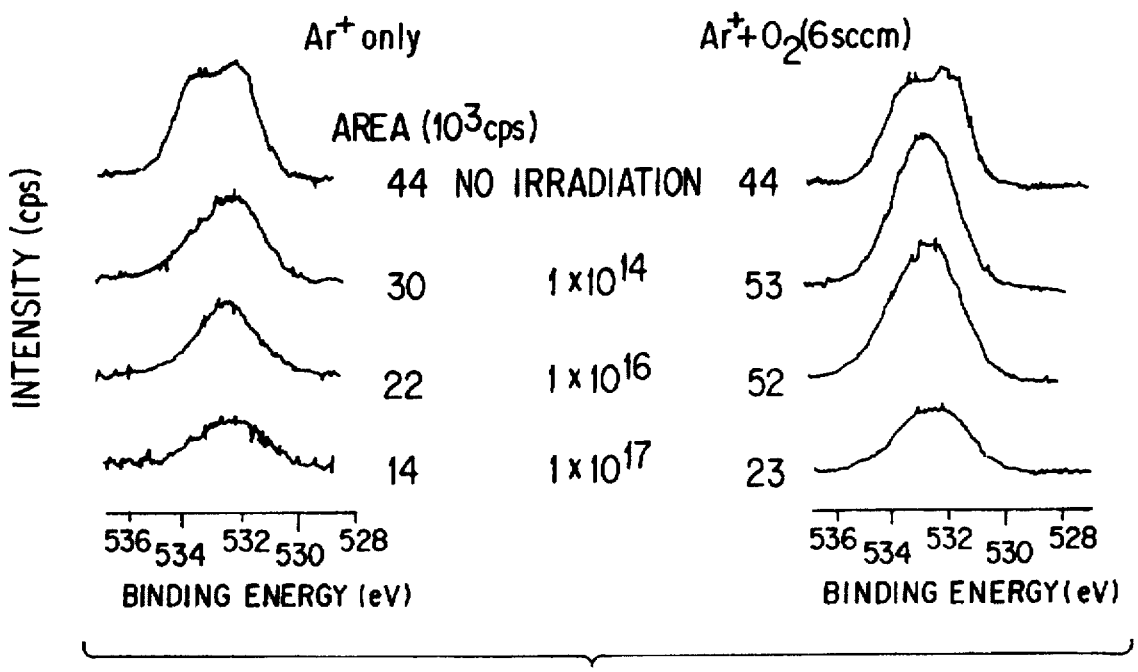

FIGS. 15A and 15B are graphs showing the results of ESCA surface analysis of samples 3-10 and 3-11.

[A: results of C1 analysis of samples 3-10 and 3-11/B: results of C1 analysis of samples 3-10 and 3-11]

FIG. 16 is a photograph showing the results of the peel-off test with Scotch tape of samples 3-1 and 3-2 which are deposited with aluminum, according to Example 3-4.

FIG. 17 is a photograph showing the results of the peel-off test with Scotch tape of samples 3-1 and 3-2 which are deposited with copper.

Figure 18:
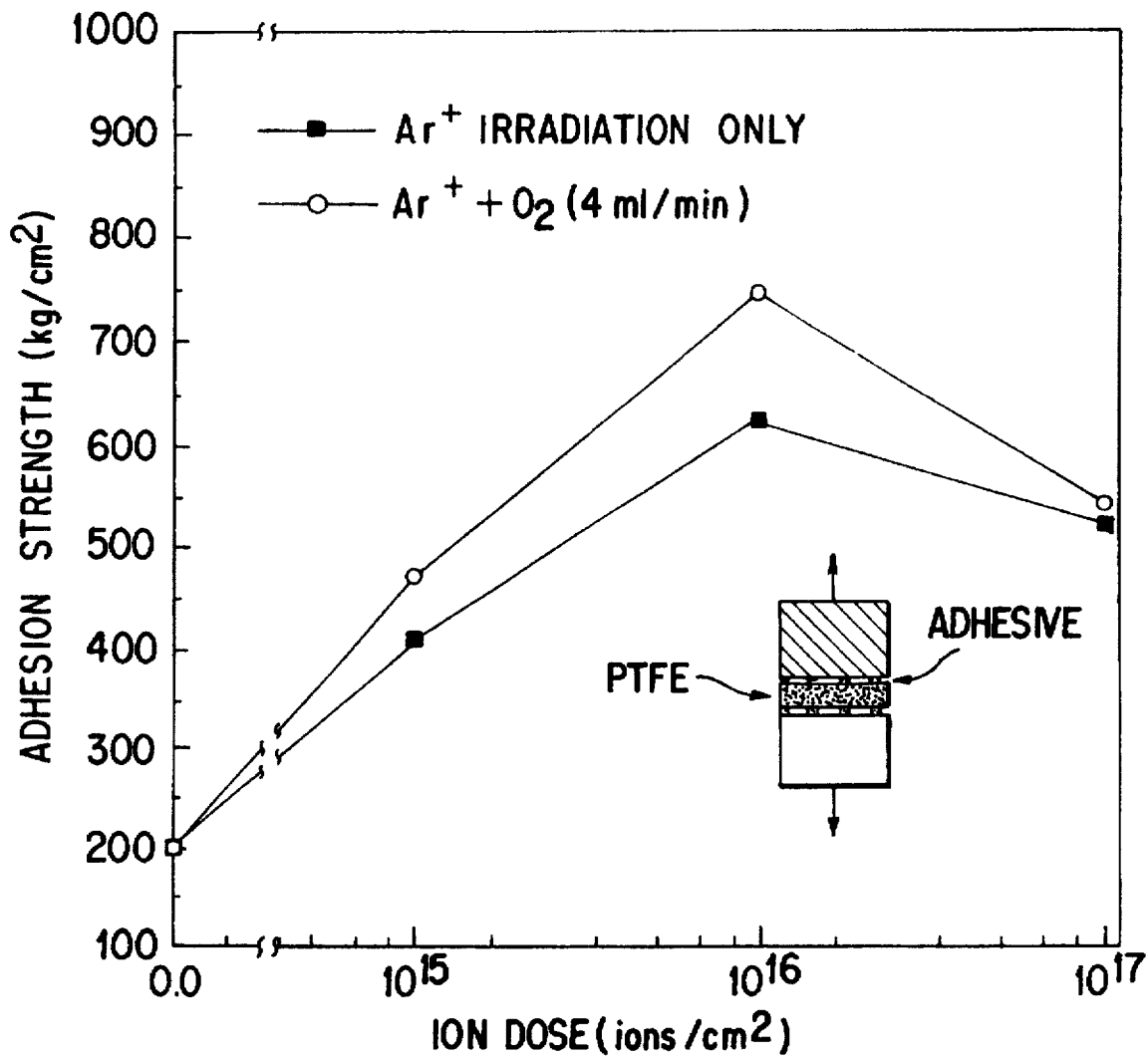

FIG. 18 is a graph illustrating the results of the adhesive strength test of samples 3-1 and 3-2 according to Example 3-5.

DETAILED DESCRIPTION OF THE INVENTION

The present invention will be described in more detail, as follows.

The term "wetting angle" used in the present invention is defined as the angle formed between a tangential line of a water drop put on a surface and the surface itself in which the water drop exists. The tangential line is drawn from a point which the water drop is in contact with the surface. For example, assuming that the shape of the water drop put on a polymer surface is a perfect sphere, the tangential line at the point where the water contacts the surface (at a single point) would be on the surface itself. That is, the angle formed between the tangential line of a water drop which is a perfect sphere on the surface and the surface itself which includes the water drop would be 180°. More realistically, a water drop put on a polymer surface would not be a perfect sphere since the water would spread onto the surface. Looking from above, the water drop would form a circle, and lines which are equally tangent to the water drop surface can be formed at points along the circumference of such a circle. The angle formed between one of such tangential lines and the surface inclusive of the water drop, is called the wetting angle.

A decrease in the wetting angle means that the water drop is spread widely and thinly onto the polymer surface, whereby the attraction property of the surface to water, that is to say hydrophilicity, increases. The wetting angle is measured by measuring the angle formed between the tangential line and the polymer surface using an ERMA Contact Anglemeter via a microscope after dropping 0.025 ml of three-times distilled water at four different positions on the polymer surface, and determined from a mean value of the measured values at the four positions.

When ion particles with energy are irradiated on a polymer surface under certain conditions according to the process of the present invention, the chemical bonds such as carbon-carbon, carbon-hydrogen, and carbon-oxygen etc existing in the polymer are broken by the collision with incident energetic ion particles and activated. Subsequently, these activated groups react with each other or the irradiated ion particles, or reactive gas or gases such as oxygen, nitrogen, etc. which are directly blown onto the polymer surface so that the activated groups and reactive gas or gases combine to form hydrophilic groups on the polymer surface.

The formation of hydrophilic groups can be anticipated by the fact that the wetting angle measured after irradiating ions with blowing reactive gas or gases on the polymer surface decreases, and this can be confirmed by ESCA(electron spectroscopy for chemical analysis). In ESCA, the increase in peaks of hydrophilic functional peaks for the polymer irradiated with gas or gases environment compared with that for unirradiated one proves that hydrophilic groups are developed on the polymer surface by the irradiation treatment.

In the present invention, a decrease in the wetting angle means the formation of hydrophilic groups on the polymer surface, and the formation of hydrophilic groups would mean a decrease in the wetting angle. In other words, when ion particles with energy are irradiated on a polymer surface as mentioned above, the molecular polymer chains on the polymer surface are cleaved and the irradiated ion particles with energy continuously proceed the chain cleavage until the particles lose all their energy. In the portions of the chain which have been cleaved, i.e. activated positions, the reactive gas or gases blown around the polymer can react via a reaction path thereof to form hydrophilic groups such as carbonyl, ester, hydroxyl, carboxyl, Amino, Nitro etc.

Any polymer comprising bonds of carbon, oxygen, nitrogen, fluorine, silicon, or the like can be used in the process for modifying the polymer surface according to the present invention.

As specific examples of such a polymer, polycarbonate (PC), polymethyl methacrylate (PMMA), silicon rubber, polyimide (PI), Teflon (PTFE), polyvinylidene fluoride (PVDF), polyethylene terephthalate (PET), polyethylene (PE), or the like can be used.

The wetting angle of PMMA modified according to the present invention decreases down to 8°, and that of PC decreases down to 12°. In case of PI, the wetting angle of the polymer surface decreased so significantly that the water drops dropped on the polymer surface flowed continuously and the wetting angle could not be measured, whereby the hydrophilicity of the polymer surface increased and the advantages mentioned above can be achieved. In addition, the wetting angle of the modified polymer remains constant even after washing with water, indicating that the hydrophilic groups developed on the surface are very stable.

According to an embodiment of the present invention, the irradiating amount of ion particles with energy is $10^{14}$–$5 \times 10^{17}$ ions/$cm^2$, and the energy of ion particles is 0.5 KeV–2.5 KeV, preferably about 1 KeV. In particular, the energy and fluency of ion particles varies depending upon the type of polymers. If the irradiating amount and energy of ion particles exceed a certain range, unnecessary damage to the polymer surface, such as sputtering effects, in which portions of the polymer surface are separated, undesirable cleavage of polymer chains, and other undesired effects occur.

Ion beam can be obtained by introducing particles including atoms, molecules and gases into an ion gun which is to be ionized. As for the ion gun, Cold Hollowed Cathode, Kaufman type, high frequency type, etc. can be used. Any particles which can be ionized, such as argon, oxygen, krypton, air, a mixed gas of oxygen and nitrogen, or any mixed gas thereof can be used. By applying voltage to the ion beam, the ion particles obtain energy, as described above. By adjusting the current of the ion beam, the irradiating amount of ion particles can be controlled. The current of the ion beam can be controlled according to discharge current, discharge voltage, acceleration potential, or the like.

When the ion particles are irradiated onto the polymer surface, a portion of these particles react directly on the polymer surface, however most particles are used to cleave the chemical bonds within the polymer. Once the reactive gas or gases described above are introduced, the pressure in the vacuum chamber increases from the original vacuum condition of $10^{-5}$–$10^{-6}$ torr to $10^{-4}$–$5 \times 10^{-4}$ torr, and maintained thereafter. The above described vacuum condition is appropriately set for generating particles with energy. In general, in case of low vacuum, if the pressure inside the vacuum chamber becomes too high, arc discharge occurs because of high voltage (0.5–2.5 KeV) applied to ion beams, and ion particles from the ion beam collide with other residual gas particles to hinder the gas from proceeding, before they reach the polymer surface at a certain distance, whereby the generated ions cannot effectively reach the polymer surface. In this case, the distance from the ion gun to the polymer surface must be decreased to ensure that the ion particles reach the polymer surface. In other words, the introduced amount of ion generating gas should be controlled in order to maintain a vacuum condition depending on the utility precision of polymer.

According to another embodiment of the present invention, reactive gas or gases are suitable gases which can prepare hydrophilic functional groups, for example, oxygen, hydrogen, nitrogen, carbon monoxide, ammonia, and any mixed gas etc. The introduced amount of these reactive gas or gases is limited in the range of 1–8 ml/min, in order to maintain the proper pressure for plasma generation within the vacuum chamber and to allow a sufficient amount of reactive gas required for the formation of hydrophilic groups. For introducing the reactive gas or gases, it is advantageous that the reactive gas is blown directly on the polymer surface simultaneously with the process of irradiating particles with energy on the polymer surface.

According to another embodiment of the present invention, when ion particles with energy are irradiated in an ion beam current density of 1–30 $\mu A/cm^2$, the irradiation distance is determined depending on the degree of vacuum, the distance is preferably 25 cm or less at low vacuum of $5 \times 10^{-3}$ torr or less, 25–55 cm at high vacuum of $5 \times 10^{-3}$–$1 \times 10^{-6}$ torr, and a distance of 55 cm or more at ultra high vacuum of $10^{-6}$ torr or more can be achieved. When the particles with energy reach the polymer surface to be modified, the required "mean free path" of the ion particles would vary depending on the degree of pressure in the vacuum. Thus, the distance defined above is achieved according to each range of vacuum degree. The irradiation distance can be properly adjusted because the energy of ion particles is as low as 0.5–2.5 KeV, as described above.

Figure 1:
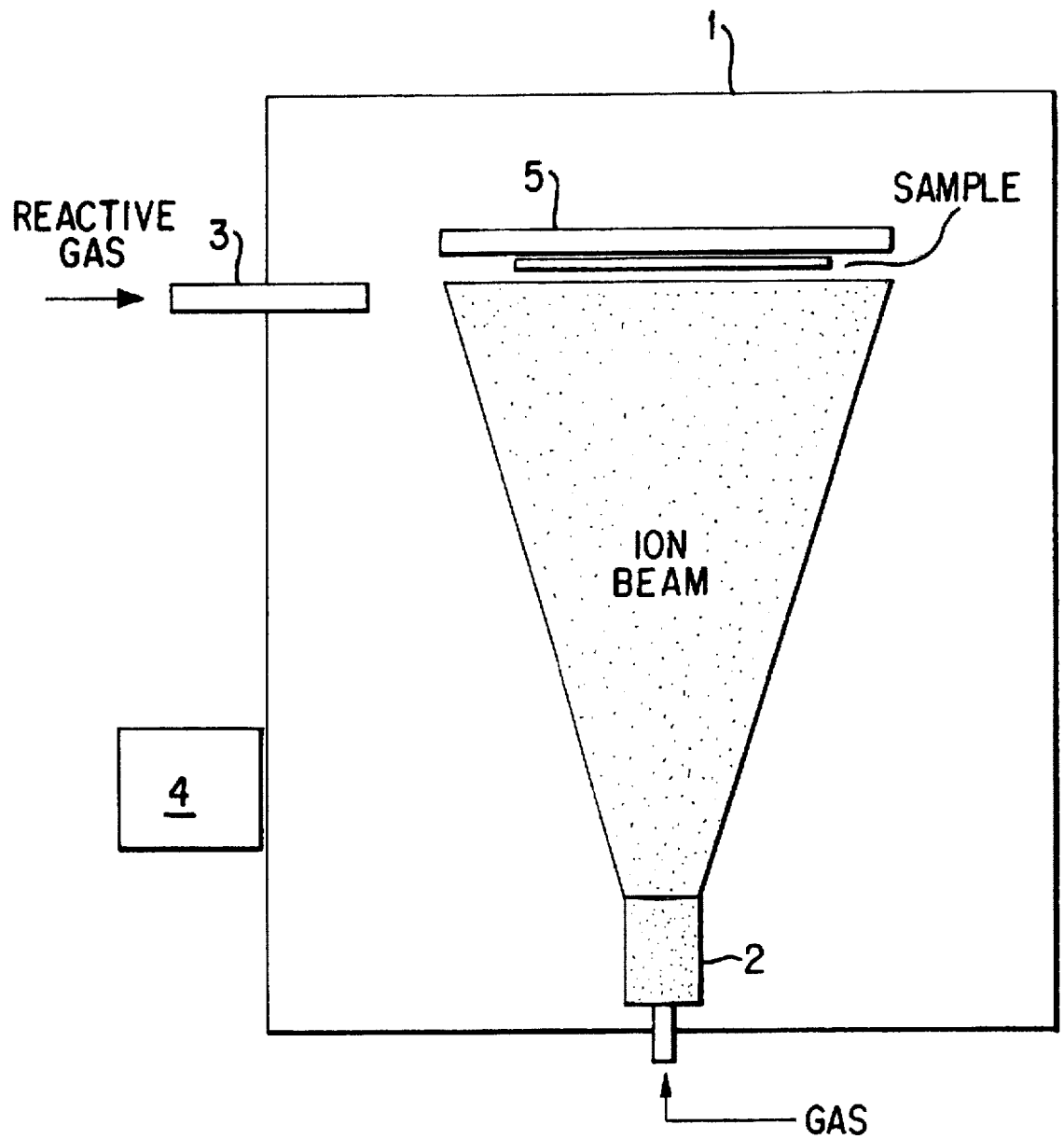
FIG. 1 is a schematic cross section view of a device for surface treatment used in the process for modifying polymer surfaces according to the present invention.

The device used in the process for modifying polymer surfaces according to the present invention, as illustrated in FIG. 1, consists of an ion gun for generating ion particles with energy, connected to an electric power source (not illustrated), a sample fixing holder(5) positioned toward the gun, a reactive gas introducer(3) provided with a controlling unit for introducing an appropriate amount of gas in order to generate reactive functional groups on the sample surface, and a vacuum chamber (1) surrounding the above elements. In the vacuum chamber, a vacuum gauge (4) is provided to allow constant vacuum conditions in the chamber.

The process for modifying polymer surfaces using the present device specifically include the following steps 1. The polymer surface is washed with soap water, organic solvent (methanol, isopropyl alcohol), or the like which effectively cleans but does not scratch the surface. Alternatively, surface impurities can be removed by irradiating particles with energy thereon.

2. If required, the polymer is stored overnight in a drying oven (60° C.) in order to remove undesired materials adsorbed on the polymer surface.

3. The cleanly washed polymer is then placed in a vacuum chamber (1) in which a vacuum is maintained at a pressure of $10^{-5}$–$10^{-6}$ torr.

4. A reactive gas is introduced around the polymer by means of a gas introducer(3) while varying the introduced amount of reactive gas within 1–8 ml/min.

5. Particles with energy are generated by introducing working gas in the ion gun(2). At this time, the electric power source (not illustrated) connected to the ion gun is appropriately adjusted to make the particles have an energy of 0.5–2.5 KeV.

6. The particles with energy are irradiated on the polymer surface in an irradiation amount of $10^{14}$–$5 \times 10^{17}$ ions/$cm^2$ by varying the ion beam current.

DESCRIPTION OF THE PREFERRED EMBODIMENT

Hereafter, the process for modifying polymer surfaces by using the present device is described in more detail referring to the Examples. However, it is not intended to limit the scope of the present invention to these Examples.

EXAMPLES

Example 1

1) Surface modification for polymer PC

Commercial polymer PC is cut into a $10 \times 10 \times 3$ $mm^3$ samples which are washed with soap water or an organic solvent such as, methanol or isopropyl alcohol. The sample is stored overnight in a drying oven with a temperature maintained at 60° C. to remove unwanted materials absorbed in the surface. The obtained polymer sample is placed into a vacuum chamber maintained at a pressure of $10^{-5}$–$10^{-6}$ torr and then, under the conditions described in Table 1 below, an ion generating gas and a reactive gas are introduced through an ion gun and a gas inlet, respectively, to perform surface modification. At this time, the introduced amount of working gas is properly controlled to maintain the vacuum in the vacuum chamber at $1\times10^{-4}$ to $5\times10^{-4}$ torr. For surface-treated samples according to the individual conditions, their wetting angles are measured by ERMA wetting Angle meter and the results are illustrated in FIG. 2(sample 1-1 and 1-2) and FIG. 3(samples 1-3 to 1-10).

TABLE 1

| No. | Ion particles | Ion energy KeV | Amount of Ion irradiation ions/cm$^2$ | Reactive gas | Amount of reactive gas ml/min |
|---|---|---|---|---|---|
| 1-1 | Ar$^+$ | 0.5–1.5 | $10^{16}$ | — | — |
| 1-2 | Ar$^+$ | 0.5–1.5 | $10^{16}$ | O$_2$ | 4 |
| 1-3 | Ar$^+$ | 1 | $10^{14}$–$5\times10^{17}$ | — | — |
| 1-4 | Ar$^+$ | 1 | $10^{14}$–$5\times10^{17}$ | O$_2$ | 2 |
| 1-5 | Ar$^+$ | 1 | $10^{14}$–$5\times10^{17}$ | O$_2$ | 4 |
| 1-6 | Ar$^+$ | 1 | $10^{14}$–$5\times10^{17}$ | O$_2$ | 6 |
| 1-7 | O$_2^+$ | 1 | $10^{14}$–$5\times10^{17}$ | — | — |
| 1-8 | O$_2^+$ | 1 | $10^{14}$–$5\times10^{17}$ | O$_2$ | 4 |
| 1-9 | Ar$^+$ | 1 | $10^{14}$–$5\times10^{17}$ | H$_2$ | 4 |
| 1-10 | Ar$^+$ | 1 | $10^{14}$–$5\times10^{17}$ | N$_2$ | 4 |

Figure 2:
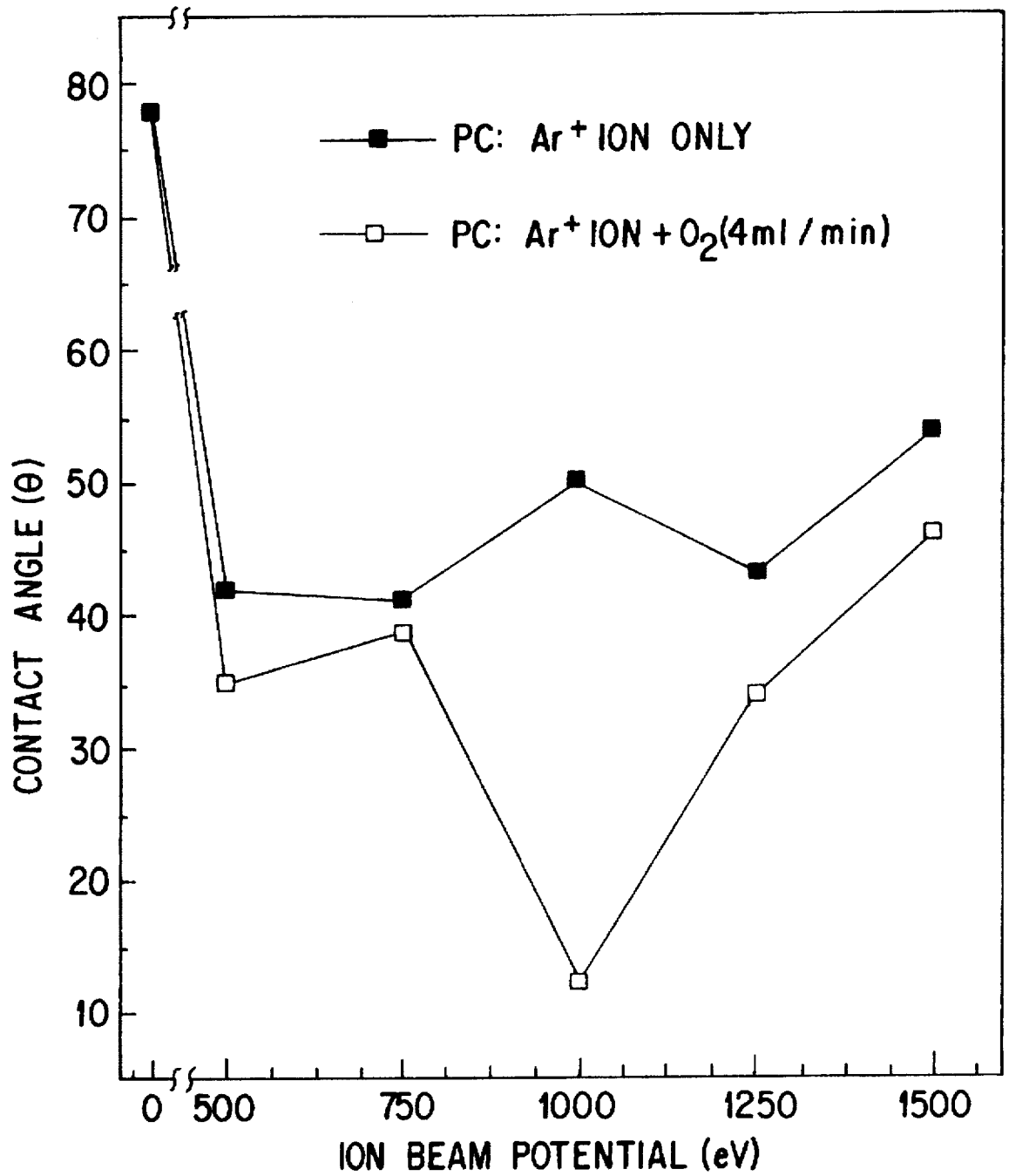
FIG. 2 is a graph illustrating the results of measuring the wetting angle of samples 1-1 and 1-2 according to Example 1-1.

FIG. 2 is a graph illustrating the results of the wetting angle change with respect to energy change of ion particles. When oxygen is blown around the polymer surface, it shows that there occurs a considerable decrease in wetting angle compared to typical wetting angle change (mainly 40°–50°). Particularly, a minimum wetting angle is achieved at 1 KeV of the ion particle energy.

Figure 3:
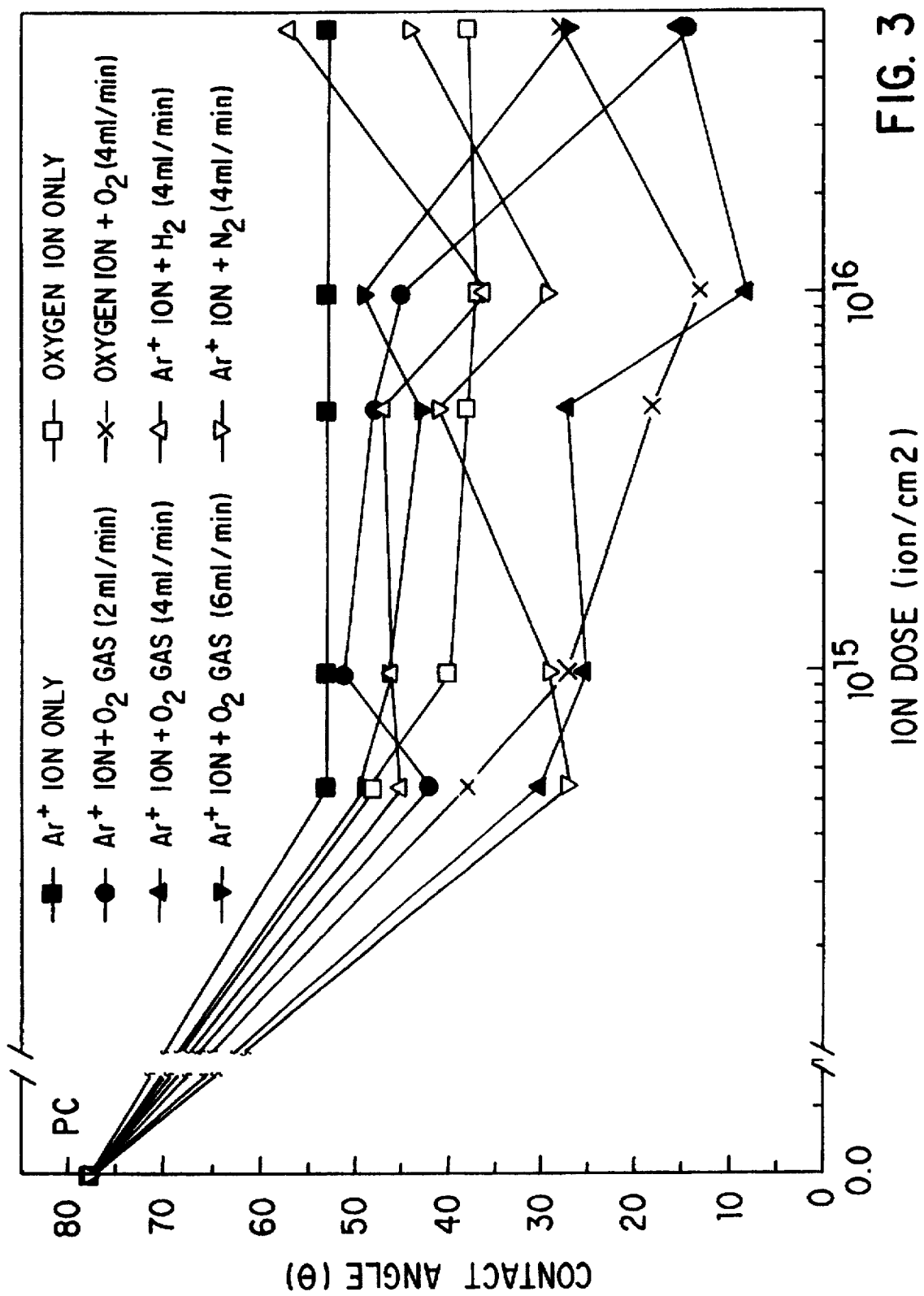
FIG. 3 is a graph illustrating the results of measuring the wetting angle of samples 1-3 to 1-10 according to Example 1-1.

FIG. 3 is a graph illustrating the result of wetting angle change of samples 1-3 to 1-10 depending on ion irradiation change at 1 KeV of ion particle energy and with samples 1-3, 1-4,5 and 6, the wetting angles change according to ion irradiation change at 1 KeV of ion particle energy have minimum values at the amount of 4 ml/min of oxygen, i.e. a reactive gas flowed around the sample, and also exhibits a minimum value at $10^{16}$ ions/cm$^2$.

Also, samples of 1-3 and 1-7, 1-5 and 1-8 are comparative cases that inert gas argon and reactive oxygen gas are irradiated on the surface, and although there is a small difference in the case where oxygen ions are irradiated on the surface compared to when argon ions irradiated on the surface, it shows similar decreases in wetting angle when ion particles with energy are irradiated while blowing oxygen around the sample. On the other hand, the wetting angle change of Comparative Example(1–3) in which only argon ions are irradiated, decreases to around 50° at $5\times10^{14}$ Ar$^+$/cm$^2$ and it exhibits a wetting angle with little difference according to the increase of irradiation amount. In contrast, in Examples(1–4) according to the present invention in which argon ions are irradiated with oxygen blowing, there totally exhibits sufficient decreasing of wetting angle according to the increasing of irradiation amount of argon ion as well as considerable decreasing in wetting angle. Particularly, minimum wetting angle(12°) appears at $10^{16}$ Ar$^+$ions/cm$^2$ of irradiation amount. These results imply that the amount of ion particles with energy and the energy itself are important factors and introduction of reactive gas around the samples plays an important role as well. In addition to this, as sample 1-3 is compared to samples 1-8, 9 and 10, it shows that wetting angle change meets well with reaction degree or electronegativity of reactive gas (oxygen>nitrogen>hydrogen).

2) Wetting angle identifying test

Sample 1-5(ion irradiation amount–$10^{16}$ ions/cm$^2$) that are surface-treated in the above test 1) and have the highest wetting angle decrease are exposed to air and the wetting angle is measured during the course of time. Also the same sample is dipped into 1% dilute hydrochloric acid for a constant time and dried with dry nitrogen gas and then wetting angle is measured again. The results of the measured wetting angles are illustrated in FIG. 4.

Figure 4:
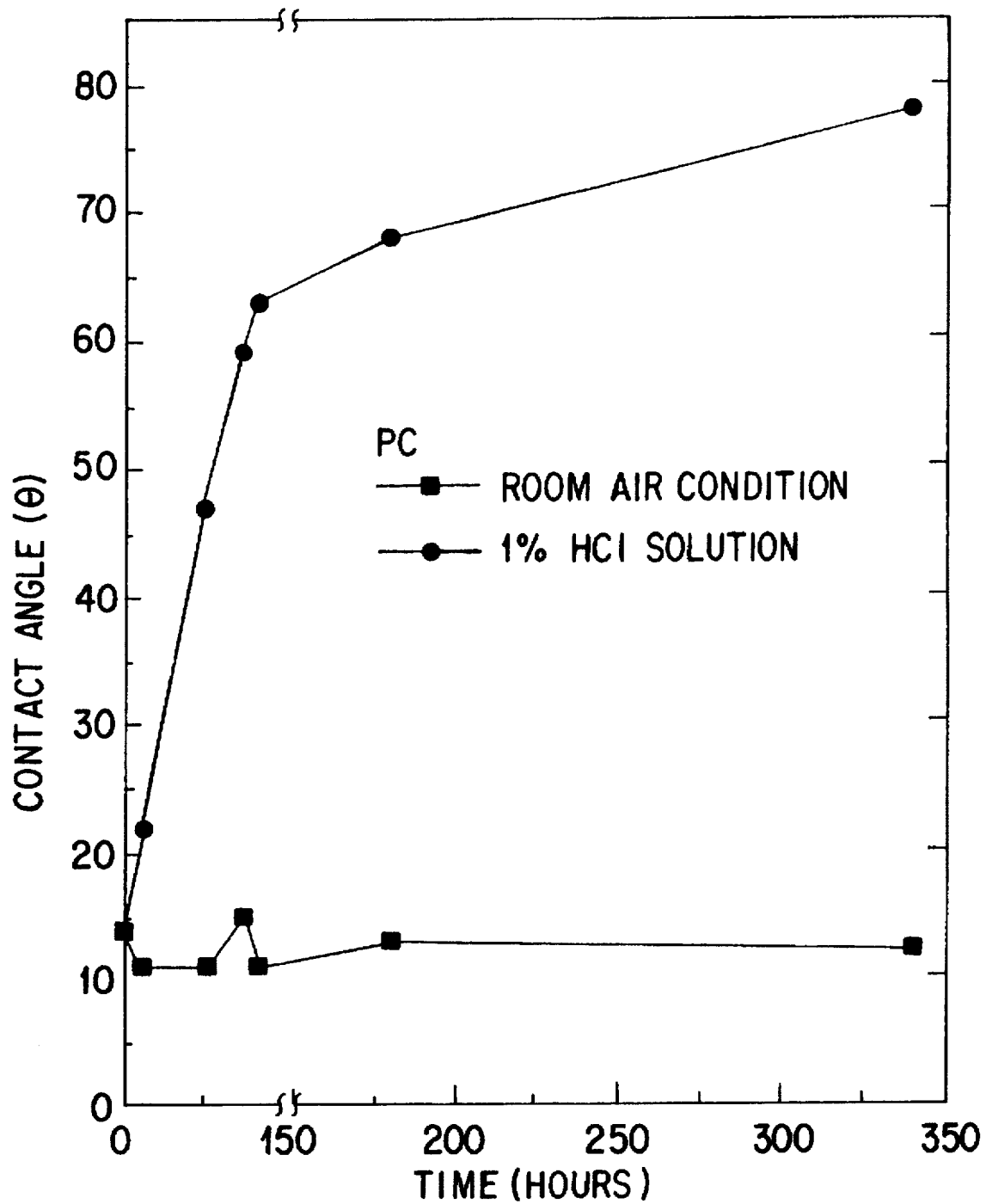
FIG. 4 is a graph illustrating the results of tests identifying the decrease of the wetting angle with respect to sample 1-5 (ion irradiation=$10^{16}$ ions/cm$^2$) according to Example 1-2.

As illustrated in FIG. 4, in the sample exposed in the air, wetting angle increases with time, but the sample dipped into 1% diluted hydrochloric acid maintains minimum wetting angle without significant changes in wetting angle. These results confirm that hydrophilic functional groups have formed on the surface of the polymer. Thus, for the sample exposed to air, it can be considered that hydrophilic functional groups formed on the polymer surface rotate with time, towards the direction of the polymer base having many polar functional groups, however, such rotation of the formed hydrophilic functional groups is prevented in the sample dipped into 1% diluted HCl due to the high polarity within HCl solution.

3) Inspection test for hydrophilic functional group formation.

ESCA surface analysis is performed on sample No. 1-5 (ion irradiation amount–$10^{16}$ ions/cm$^2$) which is compared with a sample without irradiating ions. The results are illustrated in FIG. 5.

Figure 5A:
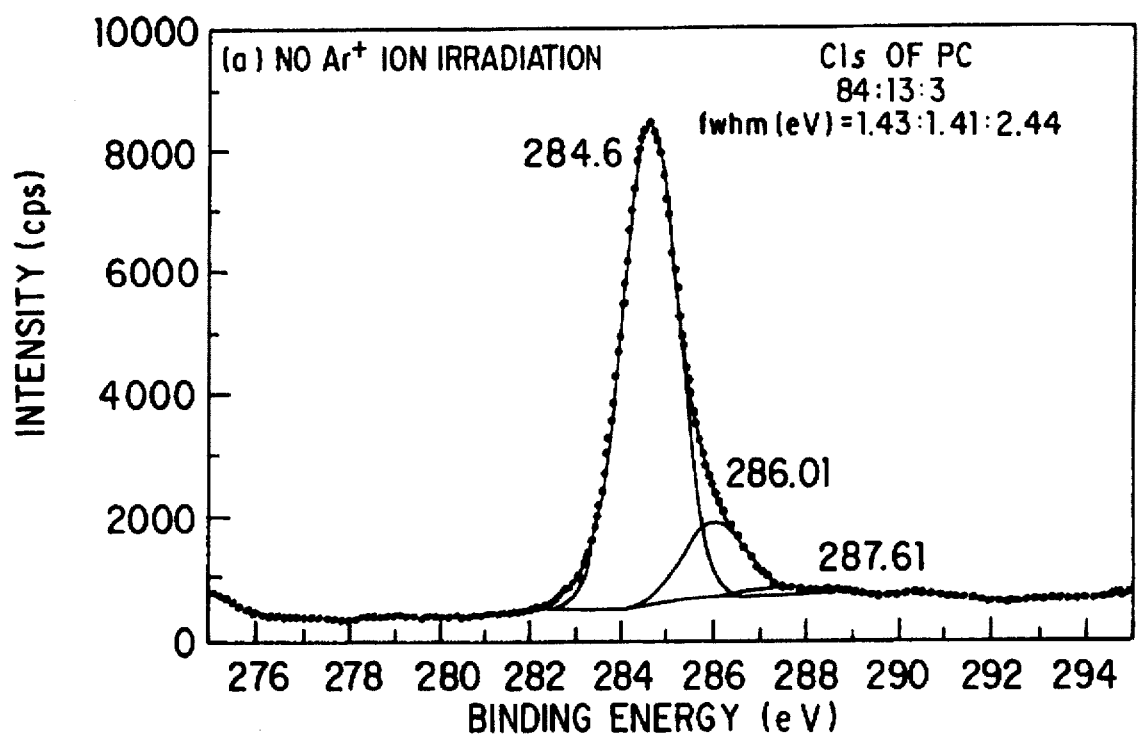
FIGS. 5A and 5B are graphs illustrating the results of ESCA surface analysis of sample 1-5 (ion irradiation=$10^{16}$ ions/cm$^2$) compared to the sample which is not irradiated. [A: results of C1 (Carbon 1) analysis of non-irradiated sample/ B: results of C1 analysis of sample 1-5]
Figure 5B:
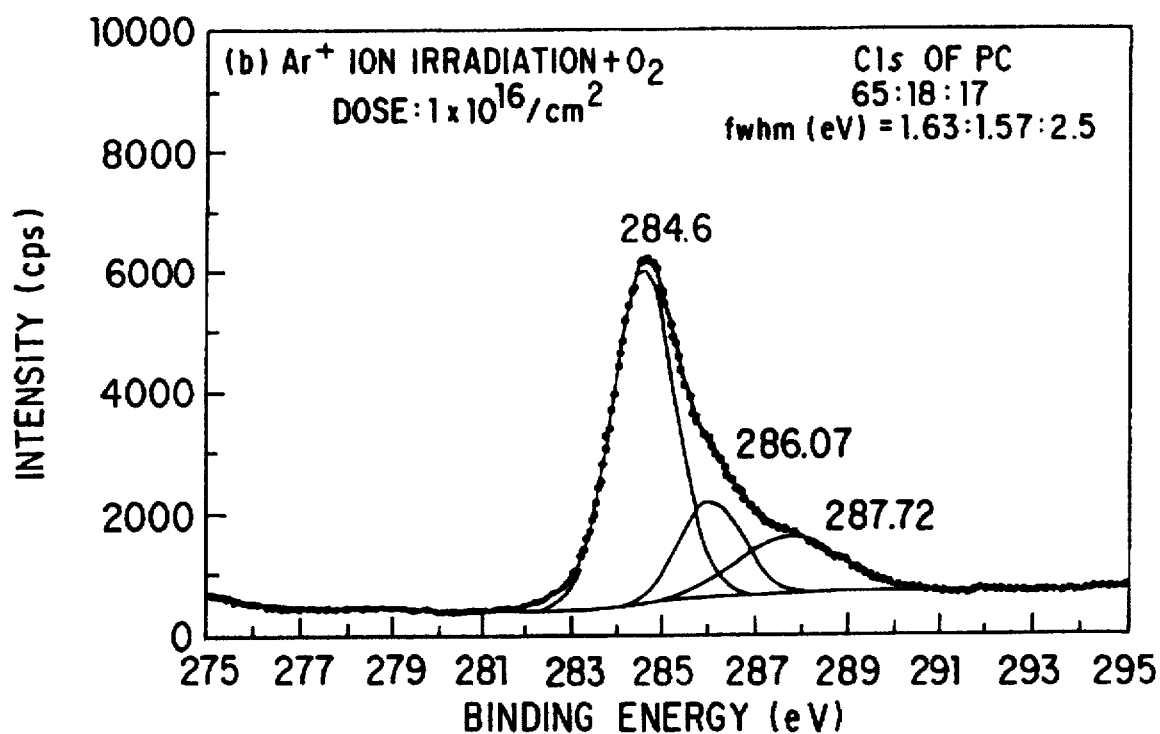

In FIG. 5, from the result of ESCA analysis with respect to carbon, it shows that hydrophilic functional groups are relatively formed more at 286 eV and 287.7 eV. Also, from the result of ESCA analysis with respect to oxygen, it shows that when the polymer surface is modified according to the present invention, oxygen reacts with the surface molecules to be bound therein so that the amount of oxygen which act as being hydrophilic to the surface increases about two-fold or more.

4) Surface roughness test

Figure 6A:
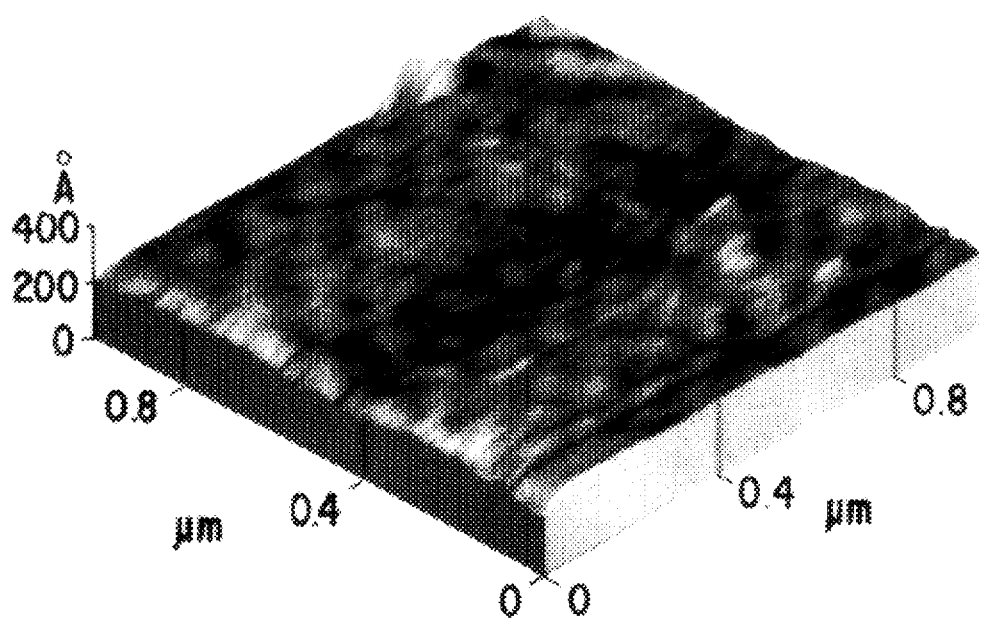
FIGS. 6A, 6B and 6C are microphotographs by AFM of samples 1-3 (ion irradiation=$5\times10^{16}$ ions/cm$^2$) and 1-5 (ion irradiation=$5\times10^{16}$ ions/cm$^2$) compared to a sample prior to surface modifying according to Example 1-4. [A: sample prior to surface modifying/B: sample 1-3/C: sample 1-5]
Figure 6B:
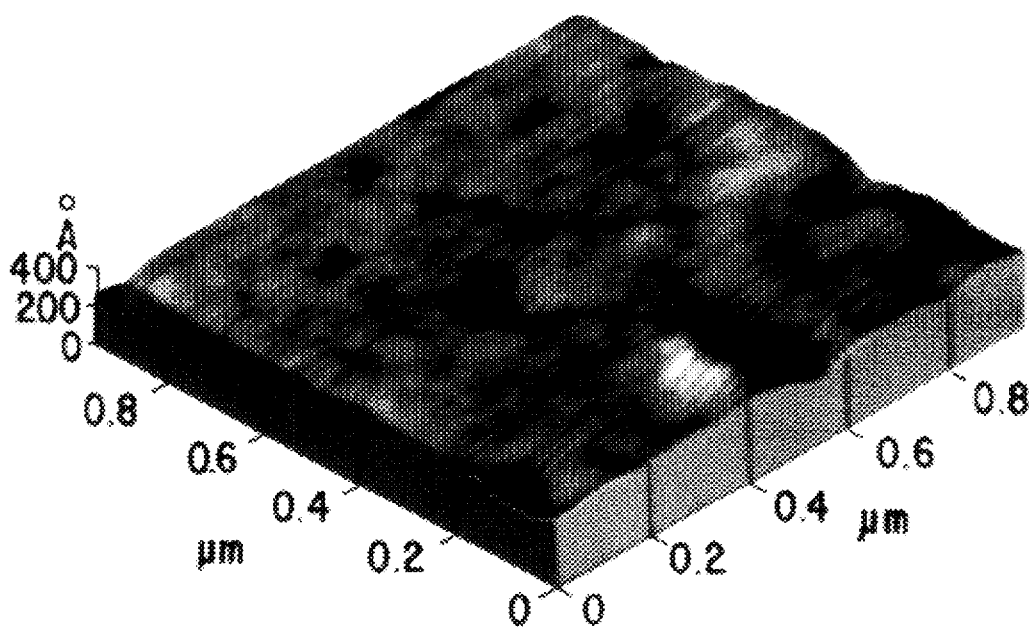

For the sample without irradiating ions and surface-treated samples 1-3(ion irradiation amount=$5\times10^{16}$ ions/cm$^2$) and 1-5(ion irradiation amount=$5\times10^{16}$ ions/cm$^2$) , their surfaces are observed by AFM(Atomic Force Microscope) and the results are illustrated in FIG. 6.

Figure 6C:
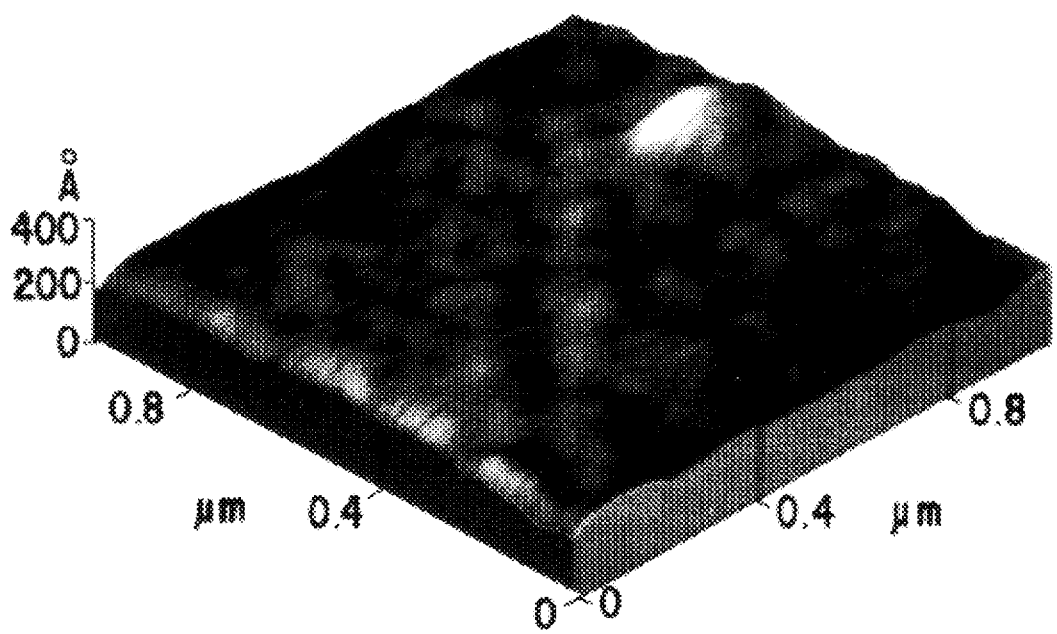

In FIG. 6, when only argon is irradiated on the sample which had an original surface roughness of about 14 Å (refer to FIG. 6A) prior to surface modification, the surface roughness is increased to about 22–27 Å (refer to FIG. 6A), and when surface modification is performed under oxygen atmosphere, surface roughness was found to be in the range of 26–30 Å (refer to FIG. 6C) similar to the above result. Such change in surface roughness shows considerable differences compared to the conventional surface modification method wherein surface roughness only changed mainly in units of µm. In other words, when the conventional surface modification had been performed to improve adhesive strength for applications in such areas as optical memory devices, the capacity of information stored per unit area of the optical memory device is largely limited by surface roughness. However, changes of surface roughness is not great according to the surface modification method of the present invention, so that significantly less decrease in memory capacity can be expected when the modified polymer of the present invention is applied to optical memory device applications.

5) Peel-off test with Scotch tape

Figure 7:
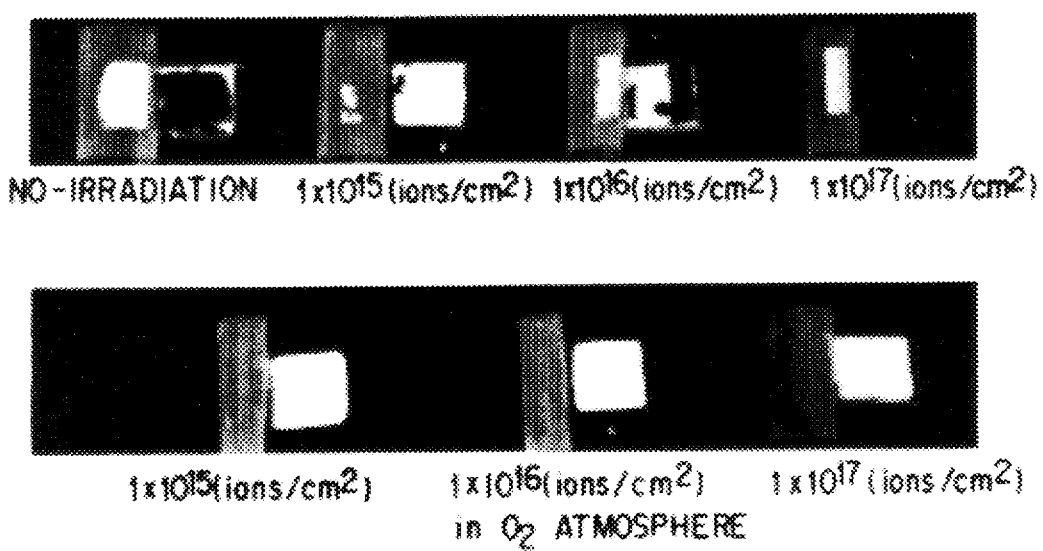
FIG. 7 is a photograph showing the results of a peel-off test with Scotch tape of sample 1-5.

Aluminum is evaporated (1000 Å) on a sample without irradiating ions and surface-modified samples 1-3 and 1-5 with irradiating ions of $10^{15}$, $10^{16}$ and $10^{17}$ ions/cm$^2$, respectively, by thermal evaporation and then, a peel-off test with Scotch tape is performed for the above samples and the results are illustrated in FIG. 7.

In FIG. 7, it shows that when only argon ions are irradiated, aluminum is partially or totally peeled-off partly or totally with Scotch tape. However, when aluminum is deposited after surface modification under oxygen atmosphere according to the present invention, the deposited aluminum does not peel off.

Example 2. Surface modification for polymer PMMA

1) Surface treatment

Figure 8:
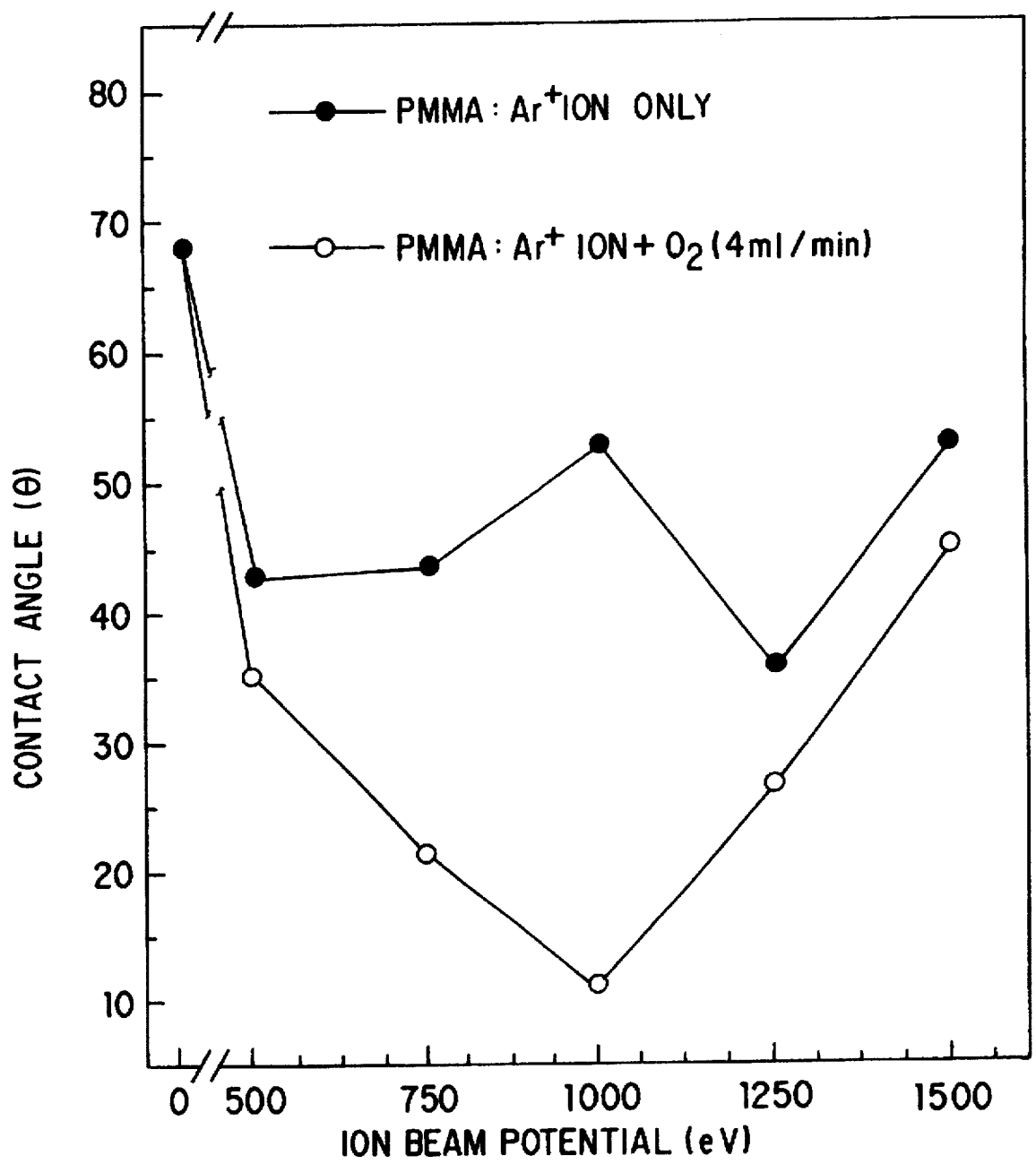
FIG. 8 is a graph illustrating the results of measuring the wetting angle of samples 2-1 and 2-2 according to Example 2-1.

Commercial PMMA is surface-treated in accordance with the same procedure as Example 1-1) under the conditions described in Table 2 below, and then the wetting angle is measured and the results are illustrated in FIG. 8(sample 2-1 and 2-2) and FIG. 9(sample 2-3 to 2-6).

TABLE 2

| No. | Ion particles | Ion energy KeV | Amount of Ion irradiation ions/cm$^2$ | Reactive gas | Amount of reactive gas ml/min |
|---|---|---|---|---|---|
| 2-1 | Ar$^+$ | 0.5–1.5 | $10^{16}$ | — | — |
| 2-2 | Ar$^+$ | 0.5–1.5 | $10^{16}$ | O$_2$ | 4 |
| 2-3 | Ar$^+$ | 1 | $10^{14}$-5 × $10^{17}$ | — | — |
| 2-4 | Ar$^+$ | 1 | $10^{14}$-5 × $10^{17}$ | O$_2$ | 4 |
| 2-5 | O$_2^+$ | 1 | $10^{14}$-5 × $10^{17}$ | — | — |
| 2-6 | O$_2^+$ | 1 | $10^{14}$-5 × $10^{17}$ | O$_2$ | 4 |

FIG. 8 is a graph illustrating the results of wetting angle change with respect to the energy change of ion particles. When oxygen is blown around the polymer surface, there is a remarkable change of the wetting angle and considerable wetting angle decreases can be observed compared to typical wetting angle decreases (mainly 40°–500°). Particularly, a minimum wetting angle can be obtained at 1 KeV of ion particle energy.

Figure 9:
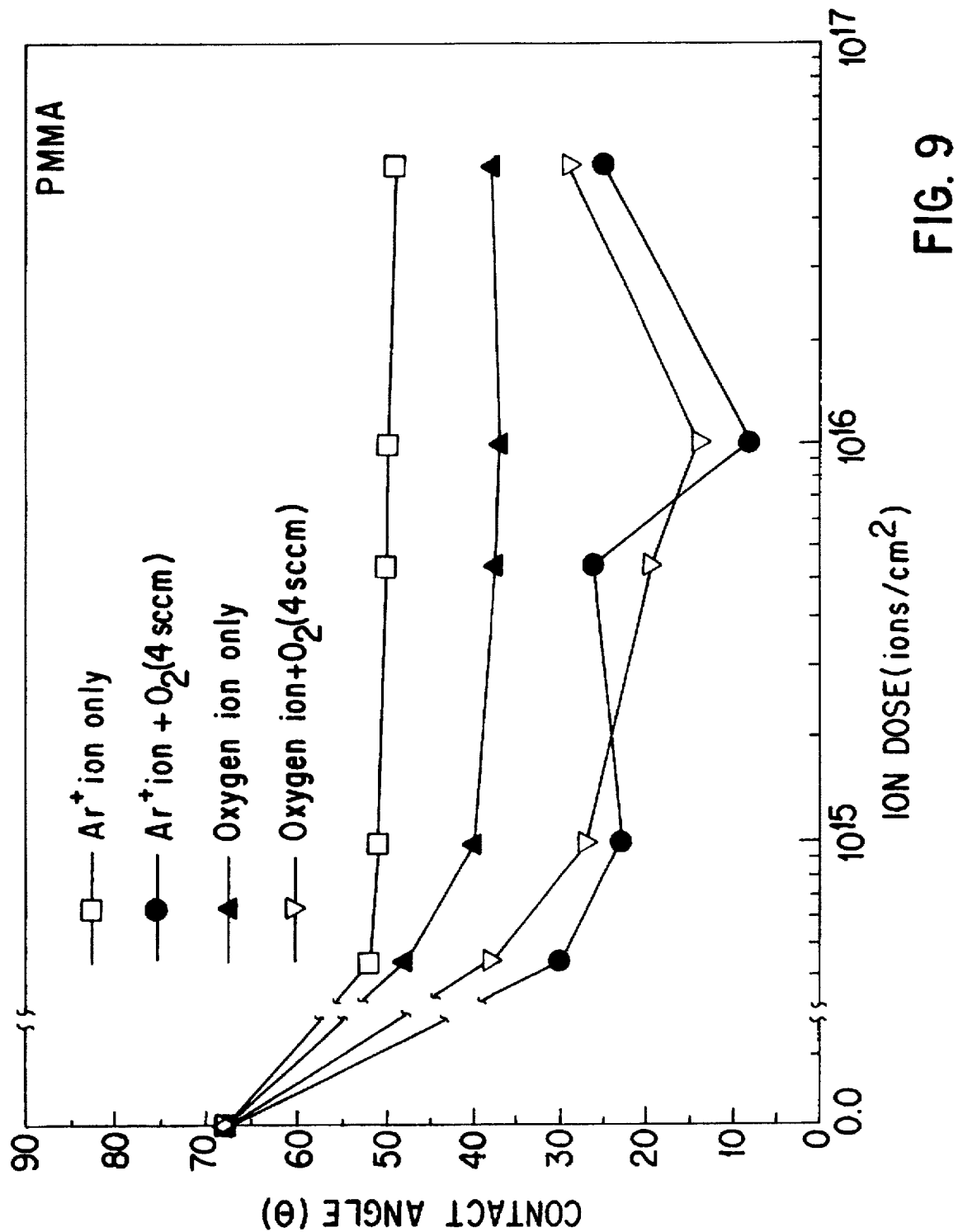
FIG. 9 is a graph illustrating the result of measuring the wetting angle of samples 2-3 to 2-6 according to Example 2-1.

FIG. 9 is a graph illustrating the results of wetting angle change of samples 2-3 to 2-6 according to ion irradiation change at 1 KeV of ion particle energy. And samples of 2-3 and 2-4, 2-5 and 2-6 are comparative examples in which inert gas argon and reactive oxygen gas are irradiated on the surface, and although there were small difference between the case that oxygen ions were irradiated on the surface and the case that argon ions were irradiated on the surface, similar wetting angle decreases were observed when ion particles with energy were irradiated while blowing oxygen around the sample. In addition to the decrease in wetting angle of Comparative Example(2-3) in which only argon ions are irradiated, to about 50° at 5×10$^{14}$ Ar$^+$/cm$^2$, no further notable changes in the wetting angle are observed as irradiation amount increases. On the other hand, with Examples(2-4) according to the present invention in which argon ions are irradiated with blowing oxygen, a significantly sufficient decrease of wetting angle according to the increase of irradiating amount of argon ions is observed. Particularly, a minimum wetting angle of 8° is observed at $10^{16}$ Ar$^+$ions/cm$^2$ of irradiation. These results, as mentioned above, imply that the amount of ion particles with energy and the amount of such energy are important factors and introduction of reactive gas around samples plays an important role as well.

2) Wetting angle identifying test

Sample 2-4(ion irradiation amount-$10^{16}$ ions/cm$^2$) which surface is treated as in the above test 1), has the greatest wetting angle decrease when the sample is exposed in the air, and the wetting angle is measured during the course of time. Also the same sample is dipped into 1% dilute hydrochloric acid for a constant time, dried with dry nitrogen gas and then wetting angle is measured. The results of the measured wetting angles are illustrated in FIG. 10.

Figure 10:
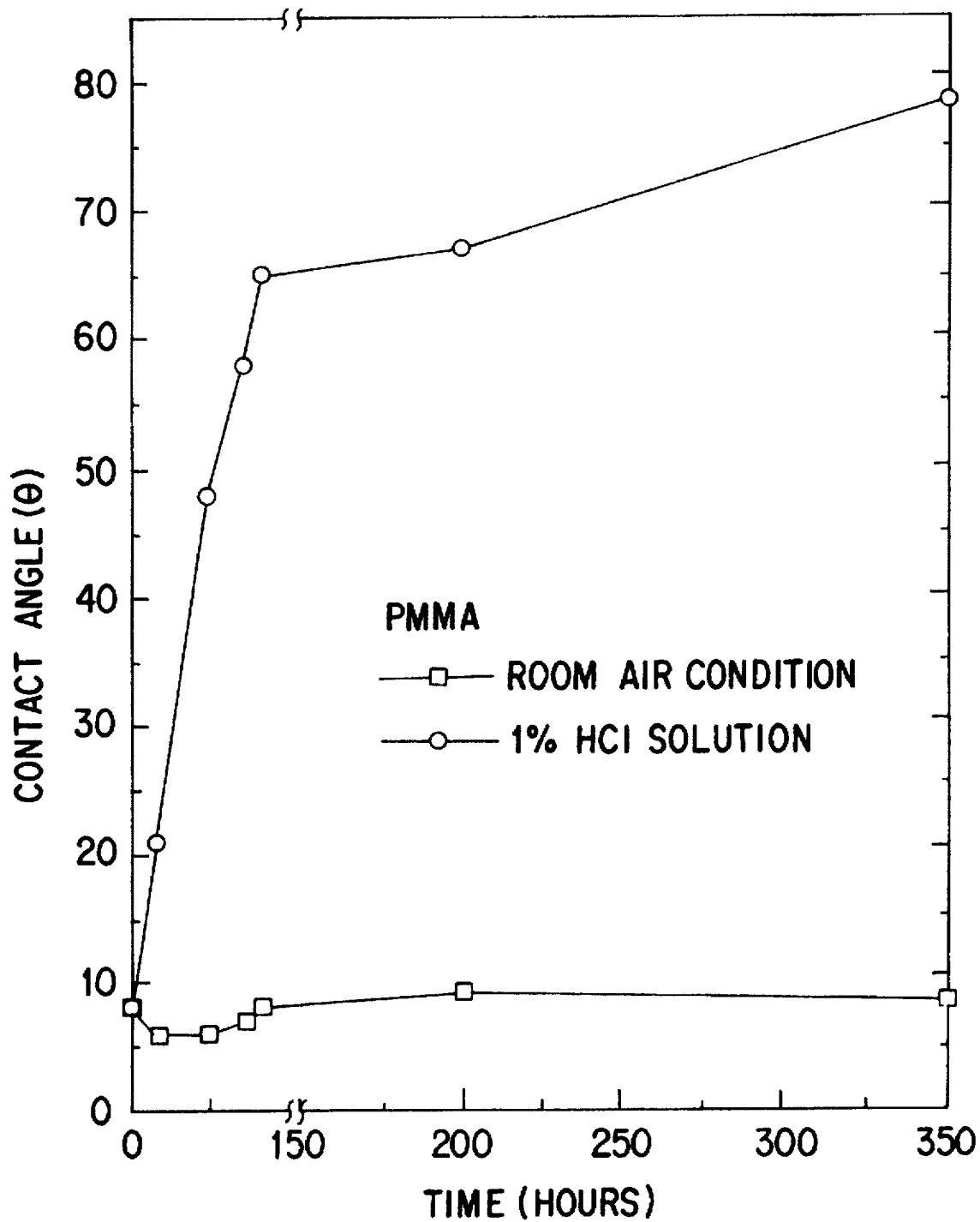
FIG. 10 is a graph illustrating the results of measuring the wetting angle of sample 2-4 (ion irradiation=$10^{16}$ ions/cm$^2$) according to Example 2-2.

As illustrated in FIG. 10, results which are similar to FIG. 4 in Example 1-2 are obtained.

Example 3: Surface modifying treatment of other polymers

1) Surface treatment

The wetting angle of commercial polymer PTFE, silicon rubber, PI and PET were surface-treated as Example 1-1) under the conditions listed in Table 3 below. The results are shown in FIG. 11.

TABLE 3

| No. | Kinds of Polymers | Ion particles | Ion energy KeV | Amount of Ion irradiation ions/cm$^2$ | Reactive gas | Amount of reactive gas ml/min |
|---|---|---|---|---|---|---|
| 3-1 | Teflon | Ar$^+$ | 1 | $10^{14}$-$10^{17}$ | — | — |
| 3-2 | Teflon | Ar$^+$ | 1 | $10^{14}$-$10^{17}$ | O$_2$ | 4 |
| 3-3 | Silicon rubber | Ar$^+$ | 1 | $10^{14}$-$10^{17}$ | — | — |
| 3-4 | Silicon rubber | Ar$^+$ | 1 | $10^{14}$-$10^{17}$ | O$_2$ | 6 |
| 3-5 | PI | Ar$^+$ | 1 | $10^{14}$-$10^{17}$ | — | — |
| 3-6 | PI | O$_2^+$ | 1 | $10^{14}$-$10^{17}$ | — | — |
| 3-7 | PI | Ar$^+$ | 1 | $10^{14}$-$10^{17}$ | O$_2$ | 4 |
| 3-8 | PI | O$_2^+$ | 1 | $10^{14}$-$10^{17}$ | O$_2$ | 4 |
| 3-9 | PI | Air$^+$ | 1 | $10^{14}$-$10^{17}$ | — | — |
| 3-10 | PET | Ar$^+$ | 1 | $10^{14}$-$10^{17}$ | — | — |
| 3-11 | PET | Ar$^+$ | 1 | $10^{14}$-$10^{17}$ | O$_2$ | 6 |
| 3-12 | PET | Kr$^+$ | 1 | $10^{14}$-$10^{17}$ | — | — |
| 3-13 | PET | Kr$^+$ | 1 | $10^{14}$-$10^{17}$ | O$_2$ | 6 |
| 3-14 | PET | O$_2^+$ | 1 | $10^{14}$-$10^{17}$ | — | — |
| 3-15 | PET | Ar$^+$ | 1 | $10^{14}$-$10^{17}$ | O$_2$ | 2 |
| 3-16 | PET | Ar$^+$ | 1 | $10^{14}$-$10^{17}$ | O$_2$ | 4 |

Figure 11A:
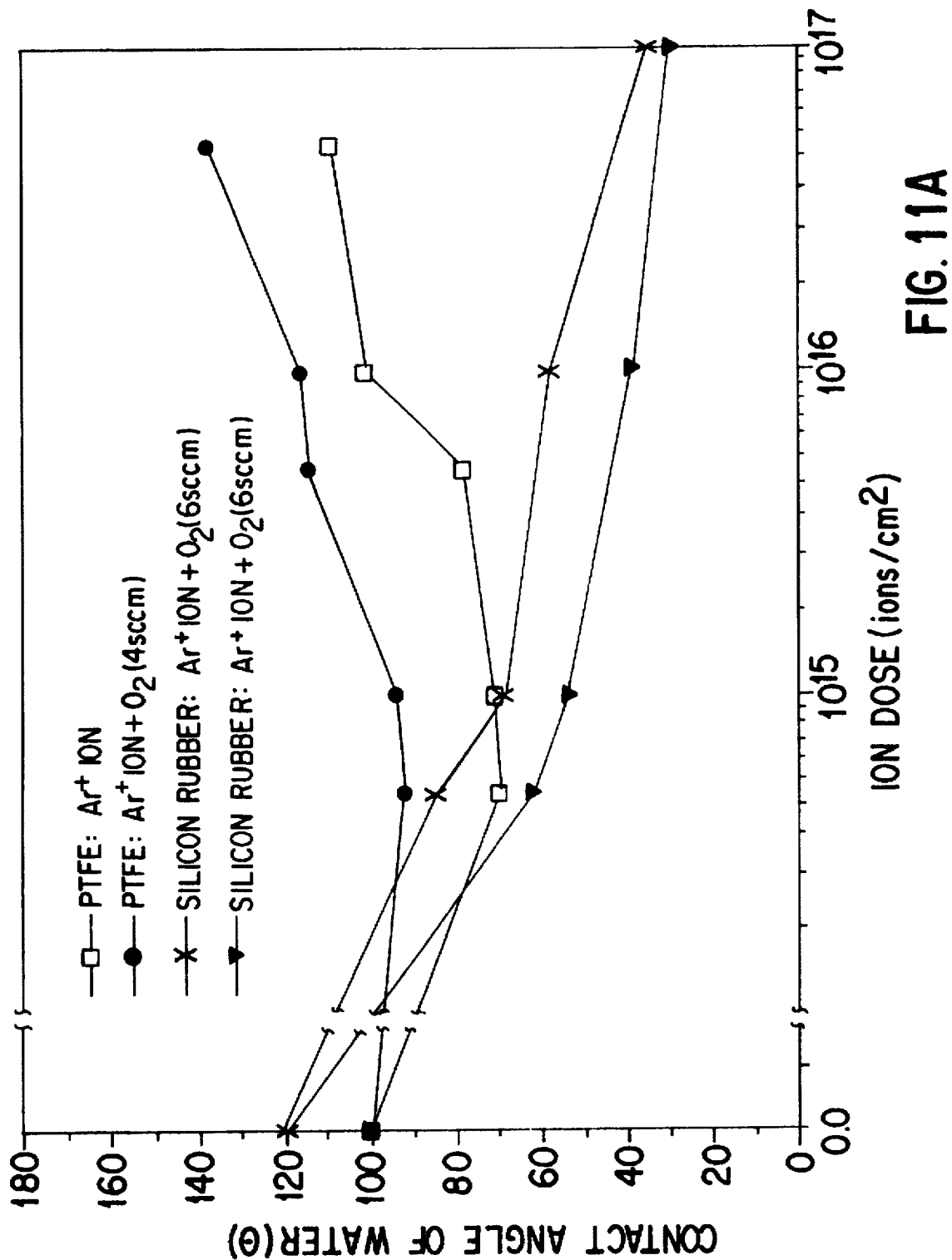
FIGS. 11A, 11B and 11C are graphs illustrating the result of measuring the wetting angle of samples 3-1 to 3-10 and 3-12 to 3-16.
Figure 11B:
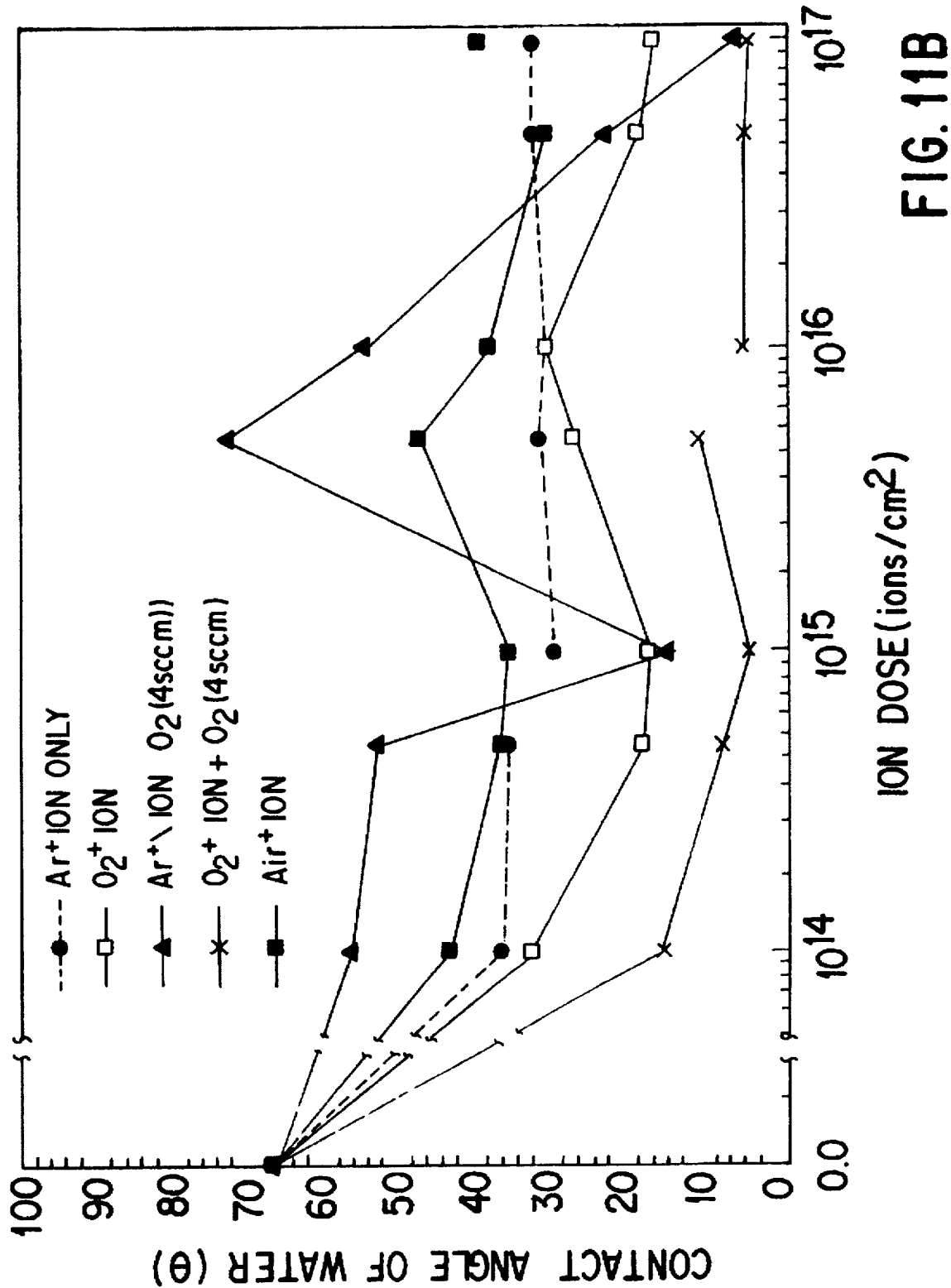
Figure 11C:
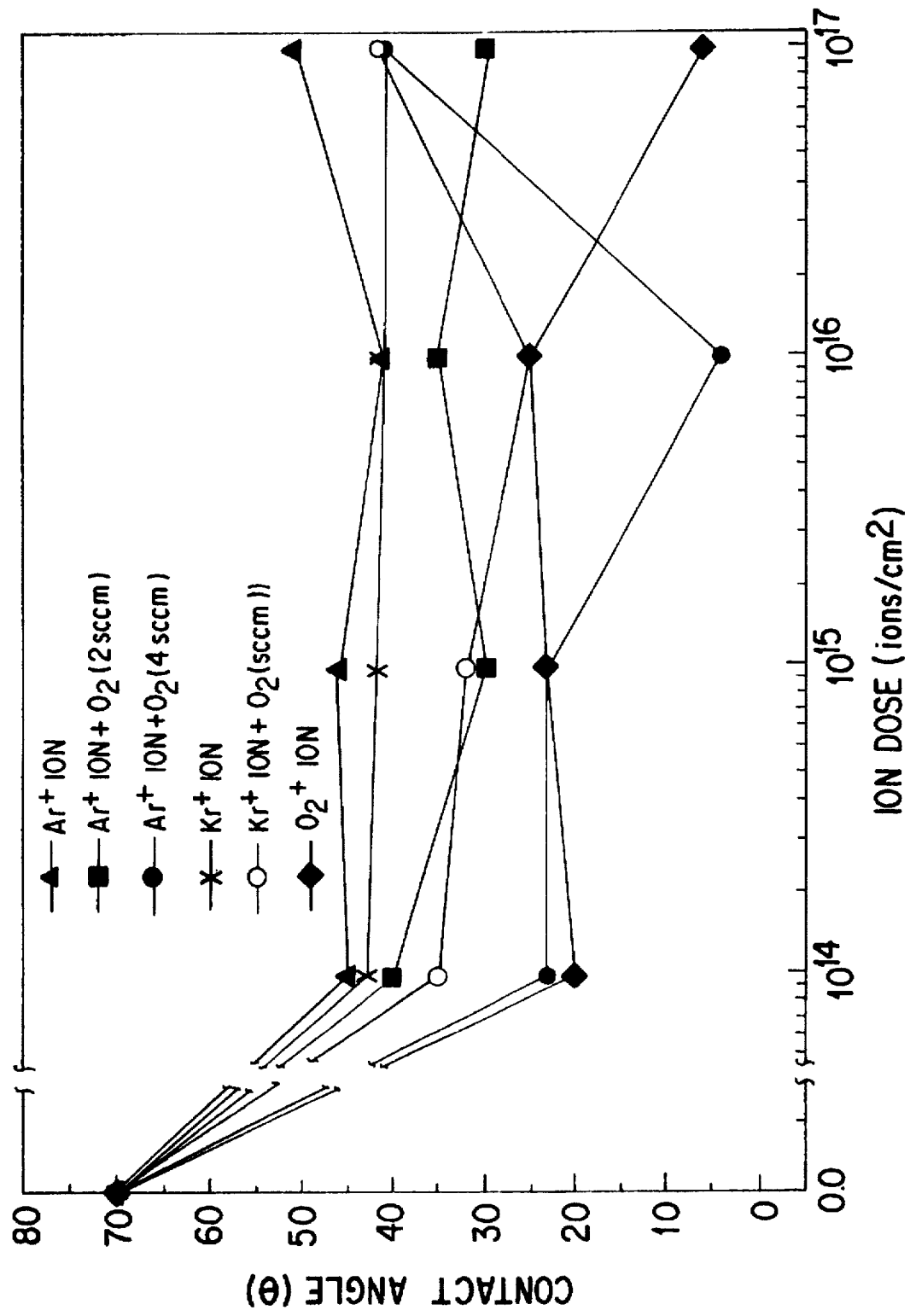

As illustrated in FIG. 11, the results obtained in case of irradiation with blowing reactive gas, oxygen, etc. around the samples as described above are also similar to the previous experiment, and it is demonstrated that surface modifying treatment using any ion particles (Air$^+$, Kr$^+$, O$_2^+$etc.) with energy, not limited to argon ion, can be applied to all polymers. In fact, in case of PE, when water was sprayed thereon, the water droplets completely spread onto the modified polymer surface according to the present invention (shown in FIG. 12B, the circular portion (lower part of photograph)) to form a transparent mirror-like surface, while on the non-modified surface, water drops formed thereon and thus light scattering occurred (FIG. 12A). This proves the excellent effects of surface modification in case of PE.

2) Test for verifying wetting angle

In the above procedure 1) samples 3-1 (ion irradiation +$10^{14}$, $10^{16}$, $10^{17}$), 3-2 (ion irradiation=$10^{14}$, $10^{16}$, $10^{17}$), 3-11 (ion irradiation=$10^{14}$, $10^{16}$, $10^{17}$), and 3-14 (ion irradiation=$10^{17}$) were exposed to air and the wetting angles thereof were measured depending on time, and after storing samples 3-1 (ion irradiation=$10^{14}$, $10^{16}$, $10^{17}$), 3-2 (ion irradiation=$10^{14}$, $10^{16}$, $10^{17}$) and 3-11 (ion irradiation=$10^{14}$, $10^{16}$, $10^{17}$) for a certain time, the wetting angles were measured. The results are shown in FIG. 13A,B,C and D.

Figure 13A:
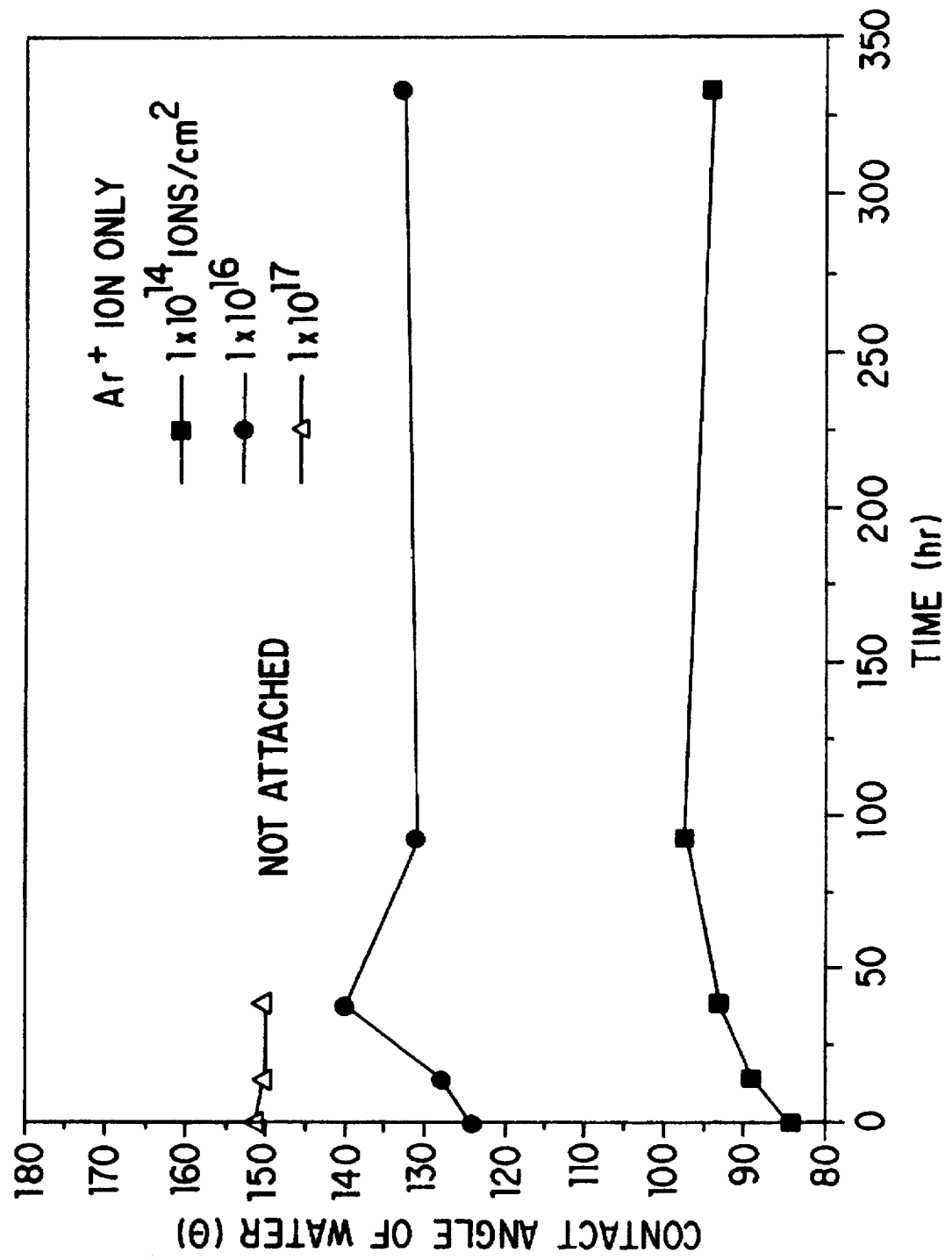
Figure 13B:
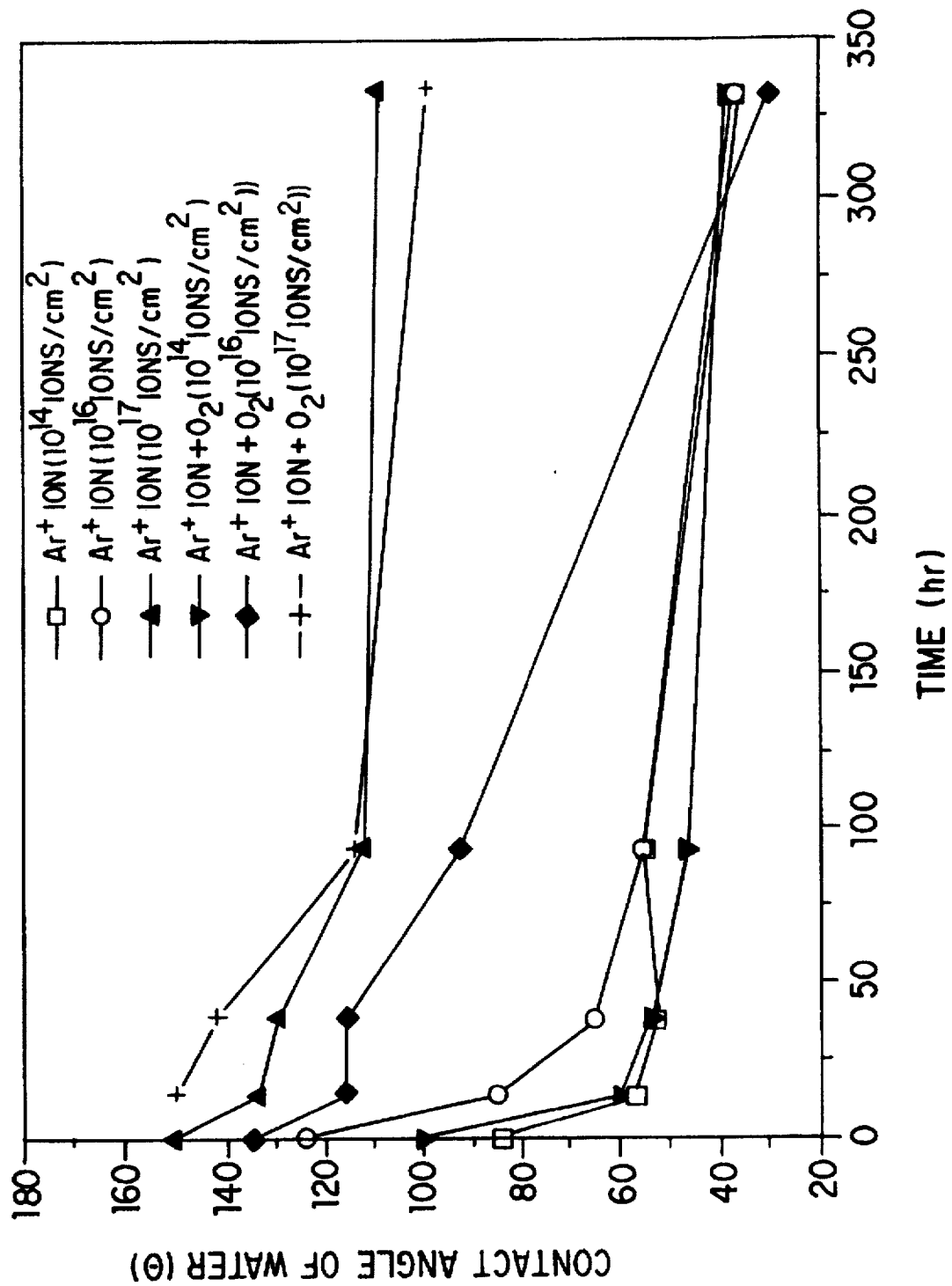

As shown in FIG. 13A, the wetting angle of the PTFE sample(3-1), which is surface-modified by only argon ion, increases somewhat during the course of time when exposed in air, but changes are minor. However, if these samples are stored in water and dried, the detected wetting angles decrease with the lapse of time (FIG. 13B). In contrast, the wetting angle of sample (3-2) which had been surface modified with blowing oxygen, prominently decreased when the sample was stored in water, as shown in FIG. 13B.

Figure 13C:
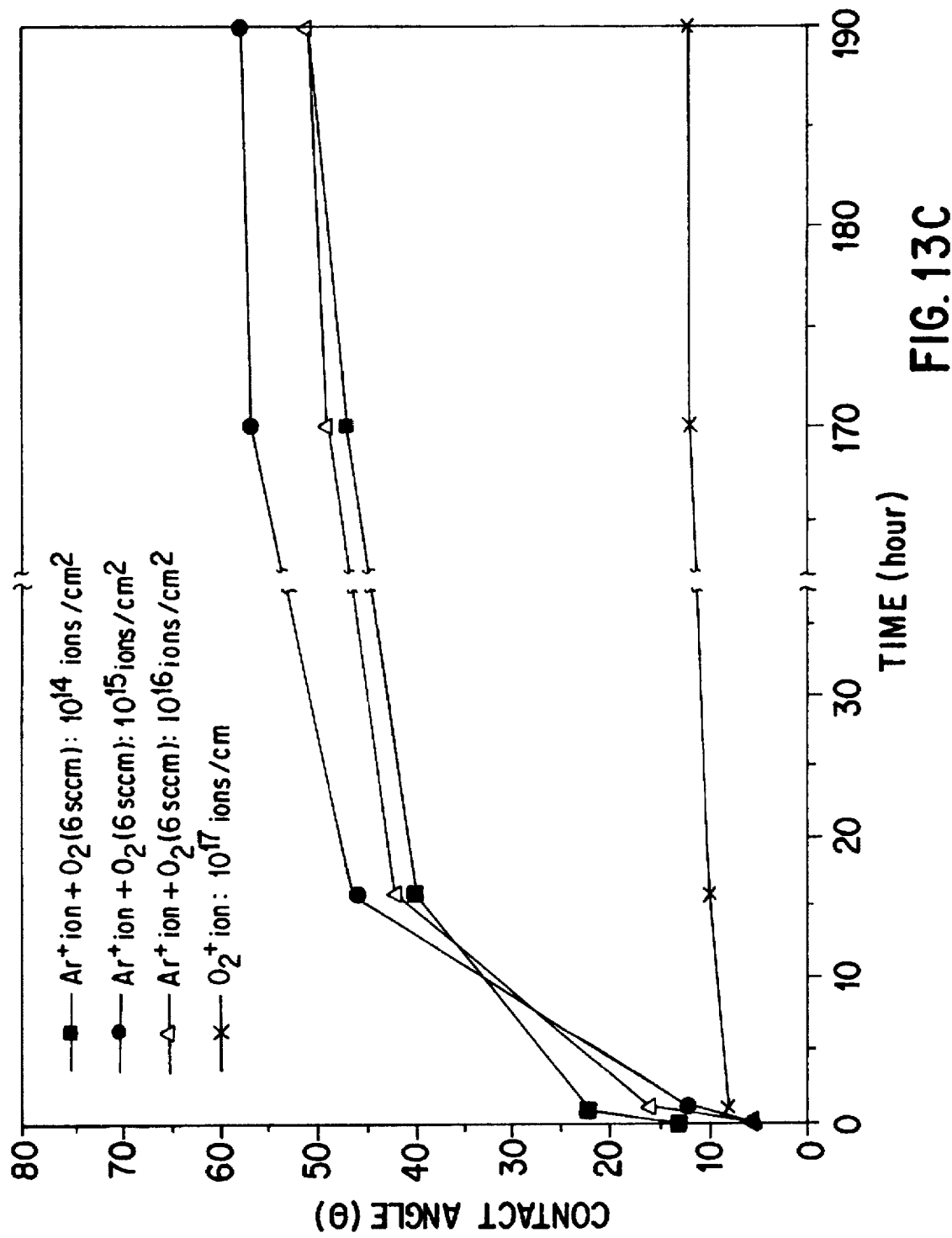

Further in FIG. 13C, the wetting angle of sample (3-11), which had been surface-modified with blowing oxygen, continuously increases with the lapse of time, whereby the surface thereof changes to be hydrophobic, and if these samples are stored in water, the wetting angles do not change and maintain constant values (FIG. 13D). However, the wetting angle of sample(3-14), irradiated by only oxygen ion beam, was almost maintained without any change with the lapse of time when the sample was exposed to air.

As a result of similar experiments conducted for samples with conventional surface treatment, i.e. storing in water, the wetting angle increases up to the original value. This is explained as a phenomenon in which the polymer surface is badly damaged by ion beam or plasma discharge, although some hydrophilic functional groups have been formed, to be dissolved in water [Polymer, vol 21, 895, 1980]. Thus, from the viewpoint that the polymer surface-modified according to the present invention maintains the decreased wetting angle even when storing the polymer in water, the present invention is different from conventional surface-treating processes.

3) Inspection test for formation of hydrophilic groups

Samples 3-1 and 3-2 which had been surface-modified with ion irradiation of $10^{15}$, $10^{16}$, $10^{17}$ ions/cm$^2$ were surface analyzed by ESCA, and the results are shown in FIG. 14. In addition, samples 3-10 and 3-11 surface-modified with ion irradiation of $10^{14}$, $10^{16}$, $10^{17}$ ions/cm$^2$ as well as a sample without irradiating ions were surface analyzed by ESCA, and the results are shown in FIG. 15.

FIGS. 14A and 14B shows comparative analytic results using ESCA with regard to Teflon. A carbon peak of 292 eV is a peak for C—F bonding, and when irradiating argon ions with blowing $O_2$ around the sample, various novel bonds such as C—O, C=O, COO, or the like are formed between C—C bonds (284 eV). In case of oxygen bond peaks, novel oxygen bonds which had not existed in the original Teflon, were generated (FIG. 14C).

In FIG. 15A, showing analytic ESCA results of PET, when only argon was irradiated on the surface, the peaks at binding energy of 288 eV and 286 eV, i.e., C=O, C—O bonds, decrease, while when argon was irradiated with blowing oxygen around the polymer, peaks became broader at the positions of 288 eV and 286 eV where hydrophilic functional groups exist on the surface. On the other hand, in case that the amount of irradiated argon is $10^{17}$ ions/cm$^2$, the number of hydrophilic groups decrease due to the increased number of irradiating ions. Further, as a complementary result, in the ESCA analytic result with regard to oxygen, when irradiating only argon on the surface, it was found that the amount of oxygen decreases as argon irradiation increases, while when irradiating argon with blowing oxygen, the amount of oxygen increases in the range of up to $10^{16}$ ions/cm$^2$. It is considered that this evidences the generation of hydrophilic functional groups on the polymer surface.

4) Peel-off test with Scotch tape

Aluminum (2000 Å) and copper (2000 Å) are deposited on a sample without irradiating ions and samples 3-1 and 3-2 which are surface-modified with ion irradiation of $10^{15}$, $10^{16}$ and $10^{17}$ ions/cm$^2$ by depositing and then, a peel-off test with Scotch tape is performed as in Example 1-5), and the results are illustrated in FIGS. 16 and 17.

In FIGS. 16 and 17, it shows that when only argon ions are irradiated, aluminum and copper are partially or totally peeled-off by Scotch tape. However, when the metal is deposited after the surface is modified with blowing oxygen according to the present invention, such metals are not peeled-off.

5) Test of adhesive strength by an adhesive

As illustrated in FIG. 18, an adhesive agent (Crystal Bond Buehler, Thermoplastic Cement No. 40-8100) was applied to both sides of surface-modified Teflon samples 3-1 and 3-2, and adhesive strength thereof was tested. The result is shown in FIG. 18.

As shown in FIG. 18, adhesive strength increases by surface-modification with only argon irradiation of the present experiment, and adhesive strength further increases in case of surface modification with blowing oxygen.

Thus, according to the process for modifying polymer surfaces of the present invention, hydrophilic groups are formed on the polymer surface to considerably reduce the wetting angle with water, whereby the process can be widely used in various application fields of polymers because it provides the effects of increasing or spreading of aqueous dyestuffs, increasing adhesive strength with other materials and inhibition of light scattering. In particular, in case that the polymer materials are used in preparing a reflective mirror, the mirror comprised of metal foil and transparent polymer materials possess a very clean surface and has excellent adhesive strength. Further, if other materials are coated by a wet method on generating hydrophilic functional groups, a very smooth and wet coating can be obtained, and this is quite an improvement from the conventional uneven coating obtained by the conventional method. Because the formation of a hydrophilic surface is very important in the field of medical polymers, the process according to the present invention is also useful in preparation of polymers for medical use.

What is claimed is:

1. A process for modifying polymer surfaces by irradiating of ion particles with energy, from a certain distance (irradiation distance), on polymer surfaces, while blowing reactive gas or gases directly on polymer surfaces under vacuum condition, to decrease a wetting angle or to increase adhesive strength for the polymer surfaces.

2. A process according to claim 1, wherein the reactive gas or gases is/are selected from the group consisting of oxygen, nitrogen, hydrogen, ammonia, carbon monoxide and any mixture of gases thereof.

3. A process according to claim 1, wherein the introduced amount of the reactive gas or gases is/are 1–8 ml/min.

4. A process according to claim 1, wherein the polymer is selected from the group consisting of polycarbonate, polymethyl methacrylate, polyimide, Teflon, polyvinylidene fluoride, polyethylene terephthalate, polyethylene, silicon rubber, polypropylene, polystyrene, Acrylonitrile-Butadiene-Styrene copolymer, polyamide, Epoxy-resin, polyvinyl chloride, polyvinyl alcohol, polyoxymethylene, polyphenylene oxide, polysulfone, Phenol-Formaldehyde, melamin-resin, Acrylon-itrile-Butadiene rubber, styrene-butadiene rubber, and mixtures of polymer thereof.

5. A process according to claim 1, wherein the ion particles with energy are selected from the group consisting of argon, oxygen, air, krypton, and any mixtures thereof.

6. A process according to claim 1, wherein the energy of the ion particles is 0.5–2.5 KeV.

7. A process according to claim 1, wherein the irradiating amount of the ion particles with energy is $1\times10^{14}$ to $5\times10^{17}$ ions/cm$^2$.

8. A process according to claim 1, wherein the irradiation distance is determined depending on the degree of vacuum when the ion particles with energy are irradiated on the polymer surfaces, and the distance is 25–55 cm at high vacuum of $5\times10^{-3}$–$1\times10^{-6}$ torr, 55 cm or more at ultra high vacuum of $10^{-6}$ torr or more, and 25 cm or less at low vacuum of $5\times10^{-3}$ torr or less.

9. A polymer material of which a wetting angle of the polymer surface is decreased and the adhesive strength is increased, by irradiating ion particles with energy on the polymer surface, while blowing the reactive gas directly on the polymer surface under vacuum condition.

* * * * *

UNITED STATES PATENT AND TRADEMARK OFFICE
CERTIFICATE OF CORRECTION

PATENT NO. : 5,783,641
DATED : JULY 21, 1998
INVENTOR(S) : SEOK-KEUN KOH, ET AL.

It is certified that error appears in the above-identified patent and that said Letters Patent is hereby corrected as shown below:

Column 9, line 36, "(mainly 40°-500°)." should read
--(mainly 40°-50°).--.

Column 10, lines 52-53, "(ion irradiation +$10^{14}$, $10^{16}$, $10^{17}$)," should read --(ion irradiation =$10^{14}$, $10^{16}$, $10^{17}$),--.

Signed and Sealed this

Twenty-sixth Day of January, 1999

Attest:

Attesting Officer

*Acting Commissioner of Patents and Trademarks*